United States Patent [19]
Hongu et al.

[11] Patent Number: 5,777,867
[45] Date of Patent: Jul. 7, 1998

[54] ELECTRIC DISCHARGE METHOD AND APPARATUS

[75] Inventors: Hidetoshi Hongu; Masahiro Hamada, both of Yokohama; Masumi Fukai; Kazuo Iizuka, both of Tokyo, all of Japan

[73] Assignees: Suitomo Electric Industries, Ltd., Osaka; Sumiden Opcom, Ltd., Tokyo, both of Japan

[21] Appl. No.: 694,494

[22] Filed: Aug. 7, 1996

[30] Foreign Application Priority Data

| Sep. 14, 1995 | [JP] | Japan | 7-236546 |
| Sep. 14, 1995 | [JP] | Japan | 7-236547 |
| Sep. 14, 1995 | [JP] | Japan | 7-236548 |
| Sep. 14, 1995 | [JP] | Japan | 7-236549 |

[51] Int. Cl.$^6$ .................................. H02M 7/538
[52] U.S. Cl. ................... 363/134; 363/24; 361/257
[58] Field of Search .................. 363/22–26, 133, 363/134; 361/253–257

[56] References Cited

U.S. PATENT DOCUMENTS

| 4,261,025 | 4/1981 | Chafer et al. ................ 361/257 |
| 4,358,712 | 11/1982 | Filgas, Jr. et al. |
| 4,538,093 | 8/1985 | Melai . |
| 4,658,343 | 4/1987 | Shepard, Jr. ................. 363/22 |
| 4,710,682 | 12/1987 | Zuchtriegel ................ 315/224 |
| 4,758,386 | 7/1988 | Fleming . |
| 4,904,905 | 2/1990 | Olon ........................ 315/244 |
| 5,019,749 | 5/1991 | Ito .......................... 315/224 |
| 5,053,682 | 10/1991 | Shoda et al. ................ 315/223 |
| 5,083,065 | 1/1992 | Sakata et al. . |
| 5,117,088 | 5/1992 | Stava ...................... 219/137 PS |
| 5,165,003 | 11/1992 | Carter ........................ 385/112 |
| 5,179,928 | 1/1993 | Cour et al. .................. 123/606 |
| 5,486,993 | 1/1996 | Sakurai et al. ................. 363/98 |
| 5,495,405 | 2/1996 | Fujimura et al. .............. 363/133 |
| 5,619,402 | 4/1997 | Liu ............................ 363/131 |
| 5,640,313 | 6/1997 | Takehara et al. ................ 363/21 |
| 5,675,491 | 10/1997 | Kijima ........................ 363/133 |

FOREIGN PATENT DOCUMENTS 2 085 678 of 1982 United Kingdom ............ H05B 7/16

*Primary Examiner*—Peter S. Wong
*Assistant Examiner*—Derek J. Jardieu
*Attorney, Agent, or Firm*—Lane, Aitken & McCann

[57] ABSTRACT

Herein disclosed are a method and an apparatus for supplying an electrical energy to a pair of discharge electrodes spaced apart from each other to cause an electric discharge in a gap between the discharge electrodes. There are firstly provided an alternating voltage generator for generating, as the electrical energy, an alternating voltage having a frequency, and a capacitor connected to the discharge electrodes in series. The alternating voltage generator has a series resonant frequency. The alternating voltage of the alternating voltage generator is applied to the discharge electrodes through the capacitor. The frequency of the alternating voltage is set approximately to the series resonant frequency of the alternating voltage generator to cause a dielectric breakdown in and allow an electric discharge current to flow through the gap between the discharge electrodes. Alternatively, the frequency of the alternating voltage may be approximated to the series resonant frequency of the alternating voltage generator, for example, from a frequency higher than the series resonant frequency.

22 Claims, 10 Drawing Sheets

VOLTAGE ACROSS
DISCHARGE ELECTRODES

ELECTRIC DISCHARGE
CURRENT

FIG. 10
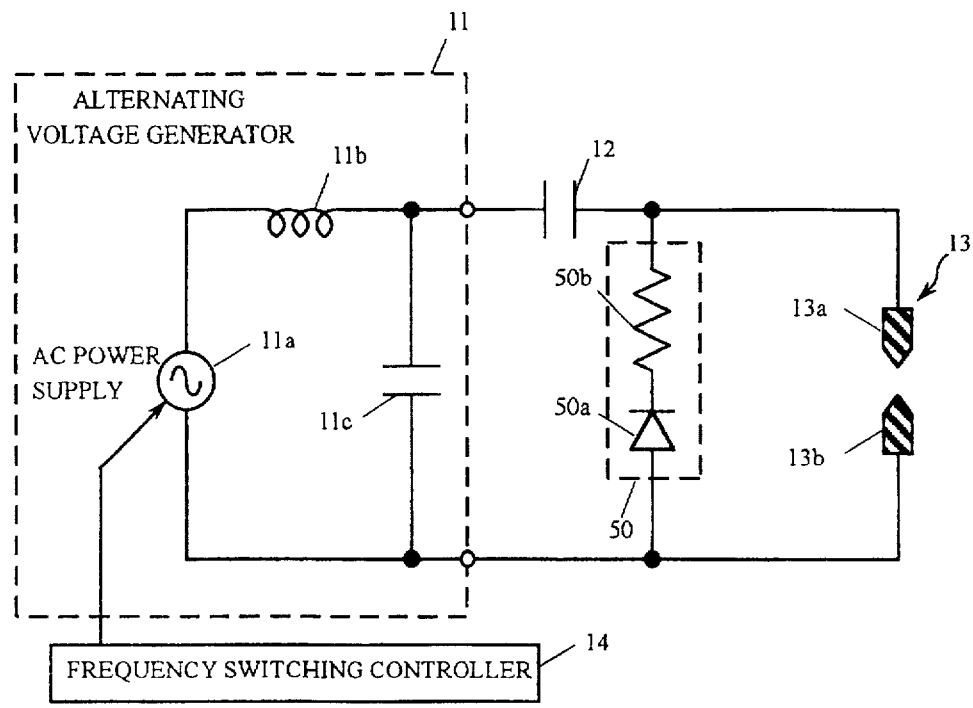
FIG. 11
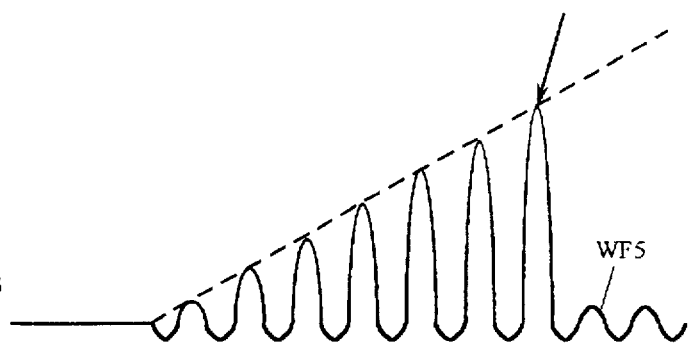
FIG. 11(a) VOLTAGE ACROSS DISCHARGE ELECTRODES
FIG. 11(b) ELECTRIC DISCHARGE CURRENT

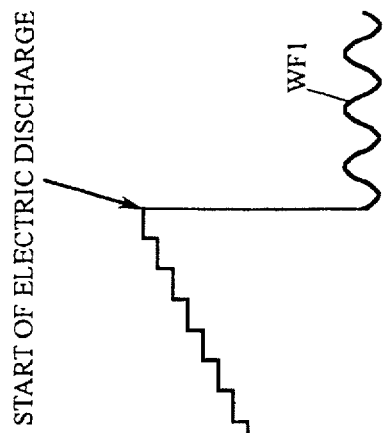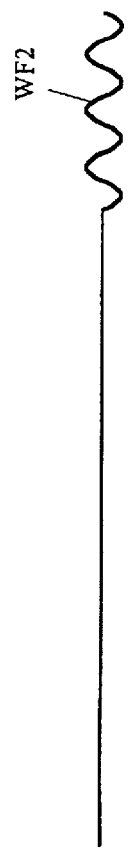
FIG. 18(a) PRIOR ART  VOLTAGE ACROSS DISCHARGE ELECTRODES
FIG. 18(b) PRIOR ART  ELECTRIC DISCHARGE CURRENT

ELECTRIC DISCHARGE METHOD AND APPARATUS

BACKGROUND OF THE INVENTION

1. Field of the Invention

The present invention relates in general to electric discharge method and apparatus and, more particularly, to method and apparatus for supplying an electrical energy to a pair of discharge electrodes spaced apart from each other to cause an electric discharge in a gap between the discharge electrodes. The method and apparatus may be applied to fusion splicing method and apparatus for splicing a pair of optical fibers to each other by exerting the electric discharge upon the optical fibers and, additionally, applied to dust collecting method and apparatus, electrostatic painting method and apparatus, and an electric discharge tube.

2. Description of the Related Art

There have so far been proposed a wide variety of electric discharge apparatuses which cause an electric discharge in a gap between a pair of discharge electrodes spaced apart from each other. Such electric discharge apparatuses are disclosed in the publication "Fusion Splices for optical fibers by high frequency trigger" by Norio Kasima and Fumio Nihei, *Technical Report of the Institute of Electronics, Information and Communication Engineers*, CS80-188 (1980), pp. 67-72 and Japanese Provisional Patent Nos. 61-22555, 62-40948 and 2-5000.

The Japanese Provisional Patent No. 61-22555 teaches an electric discharge apparatus that is shown in FIG. 16 as comprising a capacitor 102, a discharge electrode unit including a pair of discharge electrodes 103a and 103b connected to the capacitor 102 in series, direct current power supply 104 generating a direct current, a boosting transformer 105 comprising a primary winding 105a, a secondary winding 105b and a center tap 105c, switching transistors 106 and 107 having three terminals consisting of base, emitter and collector terminal, diodes 108 and 109 each having an anode and a cathode, a direct current high voltage generating circuit 110 receiving an AC voltage to generate a direct current high voltage, and a high impedance resistance unit 111 for charging the capacitor 102. It is noted that the words "direct current" and "alternating current" are hereinafter referred to as "DC" and "AC" for brevity.

The DC power supply 104 has two output terminals consisting of a first output terminal which is electrically connected to the emitter terminals of the switching transistors 106 and 107, and a second output terminal which is electrically connected to the center tap 105c of the boosting transformer 105. The collector terminal of the switching transistor 106 is connected to one end of the primary winding 105a of the boosting transformer 105, while the collector terminal of the switching transistor 107 is connected to the other end of the primary winding 105a of the boosting transformer 105. The diodes 108 and 109 are inversely connected in parallel to the switching transistors 106 and 107, respectively. The secondary winding 105b of the boosting transformer 105 is connected at its one end to the discharge electrode 103a through the capacitor 102, and at its the other end to the discharge electrode 103b. The DC high voltage generating circuit 110 has a pair of input terminals respectively connected to ends of the secondary winding 105b of the boosting transformer 105, and an output terminal connected to one end of the high impedance resistance unit 111. The other end of the high impedance resistance unit 111 is connected to a current carrying line between the capacitor 102 and the discharge electrode 103a.

The base terminals of the switching transistors 106 and 107 are connected to and driven by a driving circuit (not shown). When the switching transistor 106 is driven by the driving circuit to turn on the electric current through one of two parts of the primary winding 105a divided by the center tap 105c, the switching transistor 107 is driven by the driving circuit to turn off the electric current through the other of the two parts of the primary winding 105a, and vice versa.

If the switching transistors 106 and 107 are driven in accordance with a frequency, for instance, of 20 kHz to 40 kHz, the boosting transformer 105 is operated to induce an alternating voltage in its secondary winding. Since the discharge electrode unit 103 is considered to be a load having an extremely high impedance, an electric discharge current is not allowed to flow through a gap between the discharge electrodes 103a and 103b for an instant. After the operations of the switching transistors 106 and 107 are started, the DC high voltage generating circuit 110 receives the AC voltage induced in the secondary winding 105b of the boosting transformer 105 to generate the DC voltage. The DC voltage is applied to the capacitor 102 through the high impedance resistance unit 111 to cause a small electric current to flow through the capacitor 102 and, as a consequence, the capacitor 102 is charged up during a period, for example, from ten cycles to several tens of cycles. During the period, the discharge electrodes 103a and 103b receive a voltage which is shown by a wave form WF1 in FIG. 18(a) as ascending gradually in notched shape.

The DC high voltage generating circuit 110 may be a multiple voltage rectifier unit that is shown in FIG. 17 as comprising diodes 110a and 110b, and a capacitor 110c. The diode 110a has an anode and a cathode, the anode being connected to a current carrying line between one end of the secondary winding 105b and the capacitor 102. The diode 110b has an anode connected to the cathode of the diode 110a and a cathode connected to the high impedance resistance unit 111. The capacitor 110c has a pair of plates, one of the plates being connected to the cathode of the diode 110a and the anode of the diode 110b, and the other of the plates being connected to a current carrying line between the other end of the secondary winding 105b and the discharge electrode 103b.

As the charges of the capacitor 102 are repeated, the voltage across the capacitors 102 is increased. When the sum of the output voltage induced in the secondary winding 105b and the voltage across the capacitor 102 exceeds a trigger voltage, a dielectric breakdown is caused in the gap between the discharge electrodes 103a and 103b and, accordingly, an electric discharge current is allowed to flow through the gap between the discharge electrodes 103a and 103b as understood from the wave form WF2 of the discharge current shown in FIG. 18(b). Once the electric discharge is caused in the gap between the discharge electrodes 103a and 103b, the electric discharges are repeated in simultaneous relationship to half of a cycle of the AC voltage across the discharge electrodes 103a and 103b under the condition that the voltage across the discharge electrodes 103a and 103b is considerably lower than the trigger voltage. At this time, a series resonant current flows from the boosting transformer 105 to the discharge electrodes 103a and 103b through a series circuit defined by a leakage inductance of the boosting transformer 105 and a capacitance of the capacitor 102. The diodes 106 and 107 are operated to return the electrical power from a secondary side circuit including the secondary winding 105b back to the DC power supply 104.

When the electric discharge apparatus thus constructed serves as an optical fiber fusion splicing apparatus, a pair of optical fibers are spliced to each other by the energy of the electric discharge between the discharge electrodes 103a and 103b. In addition, the electric discharge produced by the optical fiber fusion splicing apparatus may be used to remove a jacket cover from the optical fiber. In this case, the optical fiber fusion splicing apparatus is required to heat the jacket cover at a relatively low temperature with respect to a temperature held during the fusion splicing. In order to control the temperature of the electric discharge, the electric discharge current may be controlled. When the jacket cover is removed by the energy of the electric discharge from the optical fiber, the electric discharge current is controlled to decrease. When the optical fibers are spliced by the energy of the electric discharge to each other, the electric discharge is controlled to increase.

A drawback is, however, encountered in a prior-art electric discharge apparatus of the above described nature in that an electrical circuit forming the apparatus is increased in size and complexity. The reason for this is that the electric discharge apparatus is required to comprise a special circuit such as the DC voltage generating unit 110.

In the meantime, the foregoing publication by Norio Kasima et al. discloses a method of controlling the electric discharge current through pulse width control techniques and dropper techniques. The Japanese Provisional Patent No. 62-40948 discloses an electric discharge current controlling method and an electric discharge current stabilizing method. The former controlling method comprises a step of controlling the electric discharge current by varying a period during which the switching transistors are in the "ON" condition. The latter stabilizing method comprises a step of stabilizing the electric discharge current by performing a feedback control on the basis of an integrated electric discharge current, and by controlling the period during which the switching transistors are in the "ON" condition.

These prior-art methods are, however, difficult to control and stabilize the electric discharge current to arbitrary values within a wide current range. If a DC/DC converter is used, the electric discharge apparatus is required to comprise a transformer for the DC/DC converter. This means that devices or circuit elements forming the electric discharge apparatus is increased in number and, accordingly, that the electric discharge apparatus becomes large-sized.

SUMMARY OF THE INVENTION

It is a primary object of the present invention to facilitate a process of starting the electric discharge caused in the gap between the discharge electrodes.

It is another object of the present invention to render the electric discharge apparatus small-sized and simple.

It is a further object of the present invention to facilitate a process of controlling the electric discharge current after the start of the electric discharge.

It is a still further object of the present invention to provide an electric discharge apparatus suitable for an optical fiber fusion splicing apparatus.

It is a yet further object of the present invention to enlarge a current range throughout which the electric discharge current is variable.

In accordance with one aspect of the present invention, there is provided a method of supplying an electrical energy to a pair of discharge electrodes spaced apart from each other to cause an electric discharge in a gap between the discharge electrodes. The method comprises the step (a) of preparing an alternating voltage generator for generating, as the electrical energy, an alternating voltage having a frequency, and a capacitor connected to the discharge electrodes in series. The alternating voltage generator has a series resonant frequency. The method further comprises the step (b) of applying the alternating voltage of the alternating voltage generator to the discharge electrodes through the capacitor, and the step (c) of setting the frequency of the alternating voltage approximately to the series resonant frequency of the alternating voltage generator to cause a dielectric breakdown in and allow an electric discharge current to flow through the gap between the discharge electrodes.

In accordance with another aspect of the present invention, there is provided a method of supplying an electrical energy to a pair of discharge electrodes spaced apart from each other to cause an electric discharge in a gap between the discharge electrodes. The method comprises the step (a) of preparing an alternating voltage generator for generating, as the electrical energy, an alternating voltage having a frequency, and a capacitor connected to the discharge electrodes in series. The alternating voltage generator has a series resonant frequency. The method further comprises the step (b) of applying the alternating voltage of the alternating voltage generator to the discharge electrodes through the capacitor, and the step of (c) of approximating the frequency of the alternating voltage to the series resonant frequency of the alternating voltage generator to cause a dielectric breakdown in and allow an electric discharge current to flow through the gap between the discharge electrodes.

In accordance with a further aspect of the present invention, there is provided an apparatus for supplying an electrical energy to a pair of discharge electrodes spaced apart from each other to cause an electric discharge in a gap between the discharge electrodes. The apparatus comprises a capacitor connected to the discharge electrodes in series, and an alternating voltage generator for generating, as the electrical energy, an alternating voltage having a frequency to apply the alternating voltage to the discharge electrodes through the capacitor. The alternating voltage generator has a series resonant frequency. The apparatus further comprises frequency setting means for setting the frequency of the alternating voltage approximately to the series resonant frequency of the alternating voltage generator to cause a dielectric breakdown in and allow an electric discharge current to flow through the gap between the discharge electrodes.

In accordance with a still further aspect of the present invention, there is provided an apparatus for supplying an electrical energy to a pair of discharge electrodes spaced apart from each other to cause an electric discharge in a gap between the discharge electrodes. The apparatus comprises a capacitor connected to the discharge electrodes in series, and an alternating voltage generator for generating, as the electrical energy, an alternating voltage having a frequency to apply the alternating voltage to the discharge electrodes through the capacitor. The alternating voltage generator has a series resonant frequency. The apparatus further comprises frequency approximating means for approximating the frequency of the alternating voltage to the series resonant frequency of the alternating voltage generator to cause a dielectric breakdown in and allow an electric discharge current to flow through the gap between the discharge electrodes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a circuit diagram showing a fifth embodiment of the electric discharge apparatus according to the present invention;

FIG. 11(a) is a wave form chart showing a variation of a voltage across discharge electrodes shown in FIG. 10;

FIG. 11(b) is a wave form chart showing a variation of an electric discharge current flowing through a gap between the discharge electrodes shown in FIG. 10;

FIG. 18(a) is a wave form chart showing a variation of a voltage across discharge electrodes shown in FIG. 16;

FIG. 18(b) is a wave form chart showing a variation of an electric discharge current flowing through a gap between the discharge electrodes shown in FIG. 16;

DESCRIPTION OF THE PREFERRED EMBODIMENTS

Figure 1:
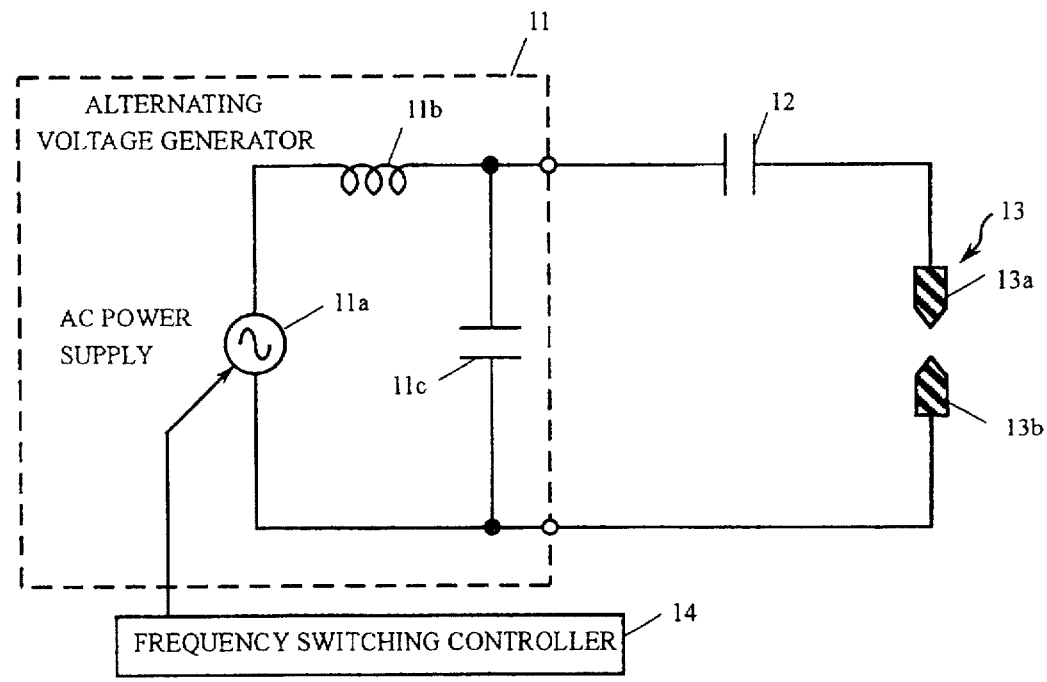
FIG. 1 is a circuit diagram showing a first embodiment of the electric discharge apparatus according to the present invention.
Figure 2:
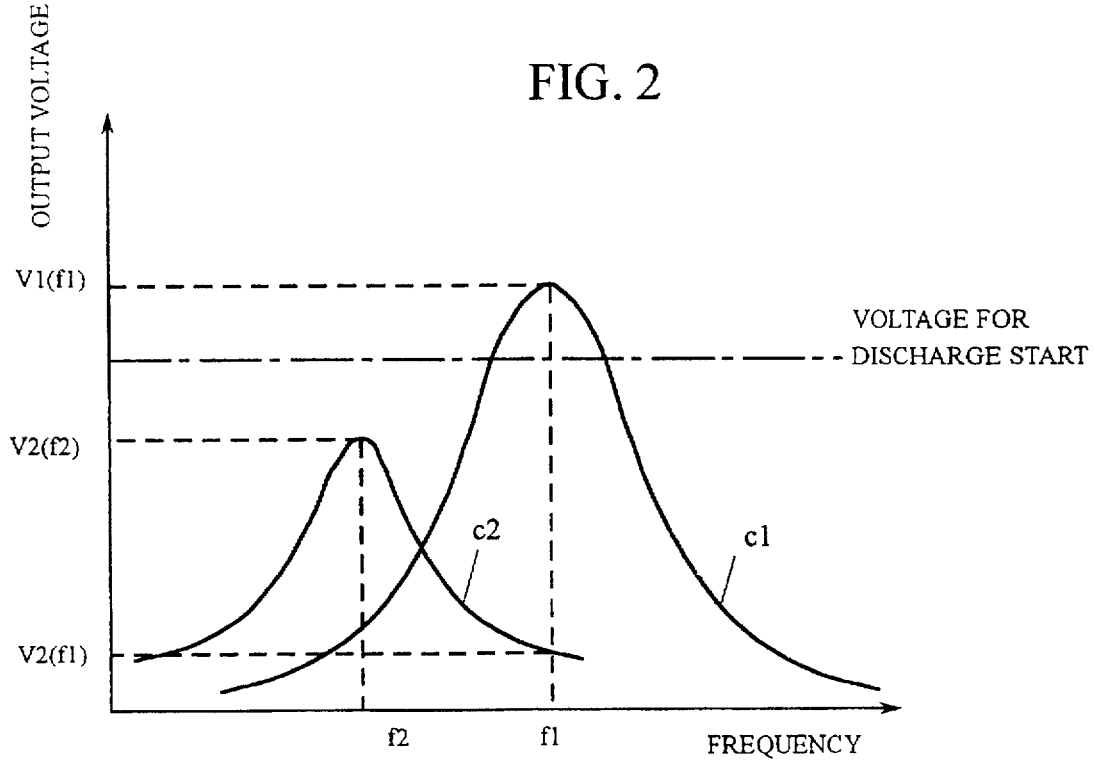
FIG. 2 is a graph showing an relationship between an output voltage of an AC power supply shown in FIG. 1 and a frequency of an alternating voltage of the AC power supply before and after an electric discharge is started.

Referring to FIGS. 1 to 3 of the drawings, a first preferred embodiment of an electric discharge apparatus according to the present invention will be described hereinafter. In FIG. 1, the electric discharge apparatus comprises an alternating voltage generator 11, a capacitor 12 and a discharge electrode unit 13 including a pair of discharge electrodes 13a and 13b, and a frequency switching controller 14.

The alternating voltage generator 11 is shown in FIG. 1 as comprising an alternating current power supply (hereinlater referred to as "AC power supply" for brevity) 11a generating an alternating voltage, an inductance element 11b connected to the AC power supply 11 in series, and a capacitance element 11c connected in parallel to a series connection of the AC power supply 11a and the inductance element 11b at a pair of connection points which correspond to a pair of output terminals of the alternating voltage generator 11. One of the output terminals of the alternating voltage generator 11 is connected to the discharge electrode 13a by way of the capacitor 12, while the other of the output terminals of the alternating voltage generator 11 is connected to the discharge electrode 13b. The frequency switching controller 14 is designed to control the alternating voltage generator 11 to regulate the frequency of the alternating voltage supplied from the AC power supply 11a.

The inductance element 11b is for example a choking coil. If the frequency of the alternating voltage supplied from the AC power supply 11a is set to a special value, the inductance element 11b may be formed by a self-inductance of a current carrying line of the alternating voltage generator 11. If the alternating voltage generator 11 is so constructed as to include a transformer, the inductance element 11b may be formed by a leakage inductance of the transformer. It is natural that the inductance element 11b may be obtained by combining the foregoing substitution techniques.

The capacitance element 11c may comprise a capacitor, if however desired, the capacitance element 11c may be formed by a stray capacitance of a circuit forming the alternating voltage generator 11, or by a combination of the capacitor 11c and the stray capacitance.

Since the discharge electrodes 13a and 13b are spaced apart from each other, the discharge electrode unit 13 is held in a high impedance condition before an electric discharge is caused in a gap between the discharge electrodes 13a and 13b. This means that the alternating voltage generator 11 has merely a load which is regarded as a series connection of the inductance element 11b and the capacitance element 11c and, as a result, the alternating voltage generator 11 has a series resonant frequency f1 defined by the inductance element 11b and the capacitance element 11c. When the frequency of the alternating voltage supplied from the AC power supply 11a is set approximately to the series resonant frequency of the alternating voltage generator 11, an extremely high series resonant voltage is produced at the output terminals of the alternating voltage generator 11. The frequency of the alternating voltage supplied from the AC power supply 11a may be set just to the series resonant frequency of the alternating voltage generator 11, or to a frequency that is in the vicinity of the series resonant frequency of the alternating voltage generator 11. The produced series resonant voltage is divided into two voltages respectively applied to the capacitor 12 and the discharge electrode unit 13. The voltage across the discharge electrodes 13a and 13b is represented by a wave form WF3 shown in FIG. 3(a) which has absolute voltage peaks increased step by step with the lapse of time.

Making the assumption that the electric discharge is not caused in the gap between the discharge electrodes 13a and 13b, the output voltage of the alternating generator 11 is peaked at the series resonant frequency f1 to reach a voltage peak V1(f1) as understood from a curve C1 in FIG. 2 which represents a resonant characteristic of the alternating voltage generator 11. An output voltage of the AC power supply 11a, and circuit constants of the alternating voltage generator 11 are determined with the intention of causing a dielectric breakdown in and allowing an electric discharge current to flow through the gap between the discharge electrodes 13a and 13b at a time when the frequency of the alternating voltage of the AC power supply 11a is in the vicinity of or equal to the series resonant frequency f1 of the alternating voltage generator 11.

Figure 3A:
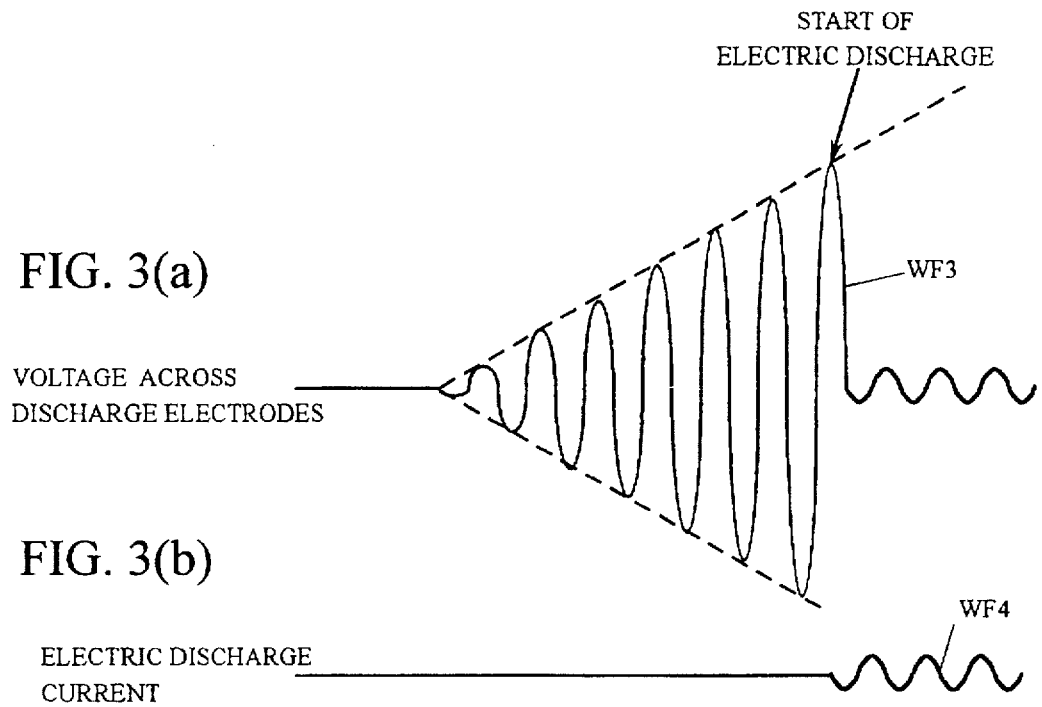
FIG. 3(a) is a wave form chart showing a variation of a voltage across discharge electrodes shown in FIG. 1.
Figure 3B:
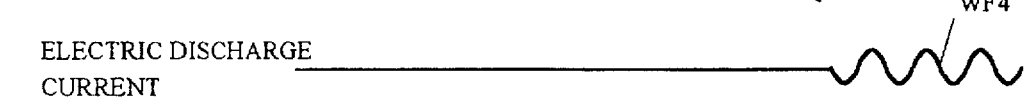
FIG. 3(b) is a wave form chart showing a variation of an electric discharge current flowing through a gap between the discharge electrodes shown in FIG. 1.

The determinations of the output voltage of the AC power supply 11a and the circuit constant of the alternating voltage generator 11 result in the fact that, after the AC power supply 11a start to supply the alternating voltage, the voltage across the discharge electrodes 13a and 13b is varied as shown in FIG. 3(a). After several repetitions of the cycle of the voltage variation shown in FIG. 3(a), the electric discharge between the discharge electrodes 13a and 13b is caused to start. As a result, the electrical current flows through the gap between the discharge electrodes 13a and 13b as shown in FIG. 3(b). Although the electric discharge is shown in FIGS. 3(a) and 3(b) as starting at the positive voltage peak across the discharge electrodes 13a and 13b, the electric discharge may start at the negative voltage peak because of the fact that the start of the electric discharge is independent of the electric polarity.

After the start of the electric discharge between the discharge electrodes 13a and 13b, the gap between the discharge electrodes 13a and 13b corresponds to a load having a low impedance. This means that the capacitor 12 is connected to the capacitance element 11c in parallel and, as a consequence, that the inductance element 11b and the series connection circuit of the capacitance element 11c and the capacitor 12 collectively serve a load bored by the AC power supply 11a. The alternating voltage generator 11 and the capacitor 12 collectively forms a series resonant circuit which has a resonant characteristic represented by a curve C2 shown in FIG. 2. Since the capacitor 12 is added to the alternating voltage generator 11 to form the series resonant circuit after the start of the electric discharge, the output voltage of the alternating voltage generator 11 is peaked at a series resonant frequency f2 to reach a voltage peak V2(f2). The series resonant frequency f2 of the resonant circuit including the capacitor 12 is lower than the series resonant frequency f1 of the alternating voltage generator 11. When the discharge electrode unit 13 allows the electric discharge current to flow through the gap between the discharge electrodes 13a and 13b, a quality factor "Q" of the series resonant circuit including the capacitor 12 is caused to decrease. The voltage peak V2(f2) after the start of the electric discharge is, therefore, lower than the voltage peak V1 (f1) before the start of the electric discharge.

As will be understood from the foregoing description and FIG. 2, when the frequency of the AC voltage supplied by the AC power supply 11a is held at the series resonant frequency f1 after the starting of the electric discharge, the output voltage of the alternating generator 11 is equal to or in the vicinity of a voltage V2(f1) defining a point on the curve C2 in cooperation with the frequency f1. Not only is the voltage V2(f1) lower than the voltage peak V2(f2), but the electric discharge current in the frequency f1 is also smaller than that in the frequency f2. If the output voltage V2(f1) is enough for the electric discharge apparatus, the apparatus has no need to control the frequency of the alternating voltage of the AC power supply 11a after the start of the electric discharge.

When, on the other hand, the electric discharge current in the frequency f1 is smaller than a desired value, the discharge current can be increased by controlling the frequency of the alternating voltage of the AC power supply 11a. If the frequency of the alternating voltage of the AC power supply 11a is set for example to the series resonant frequency f2, the voltage across the discharge electrodes 13a and 13b at that time becomes largest. At the same time, the discharge electrode unit 13 allows a large electric discharge current to flow through the gap between the discharge electrodes 13a and 13b. The frequency switching controller 14 is adapted to regulate the frequency of the alternating voltage of the AC power supply 11a to adjust the electric discharge current to a desired current value. Preferably, the frequency of the alternating voltage of the AC power supply 11a may be variable throughout a frequency range between the series resonant frequencies f1 and f2.

When the electric discharge current in the frequency f1 exceeds the desired current value, the electric discharge current can be decreased by adjusting the frequency of the alternating voltage of the AC power supply 11a to a frequency level that is higher than the frequency f1. If, however, it is desired that the electric discharge current is drastically decreased, the foregoing control techniques are unsuitable to decrease the electric discharge current. That is because the inclination of the curve C2 becomes smaller as the frequency approaches the frequency f1 as shown in FIG. 2. This inconvenience is solved, for example, by decreasing the output voltage of the AC power supply 11a. It is noted that the output voltage of the AC power supply 11a is held at a voltage level higher than the discharge voltage across the discharge electrodes 30a and 30b while the electric discharge is started and maintained.

Although it has been assumed that the electric discharge apparatus includes only one AC power supply for supplying the alternating voltage variable in frequency, the electric discharge apparatus may include a plurality of AC power supplies which have different from one another in frequency of output voltage. If the AC power supplies are prepared, the electric discharge apparatus may further comprise means for selecting one of the AC power supplies to control the electric discharge current. The selecting means may comprise a switching unit which is manually operated by an operator which is automatically operated. The start of the electric discharge is detected by the operator or a discharge detecting unit automatically operated. The discharge detecting unit may comprise, for example, a device for detecting the start of the electric discharge by sensing the light of the electric discharge. Alternatively, the electric discharge apparatus may further comprise a timer device for measuring an elapsed time from the start of the electric discharge. When the timer device detects that the elapsed time exceeds a predetermined time, the timer device recognizes that the electric discharge is started and informs it the operator or the automatically operated switching unit.

Figure 16:
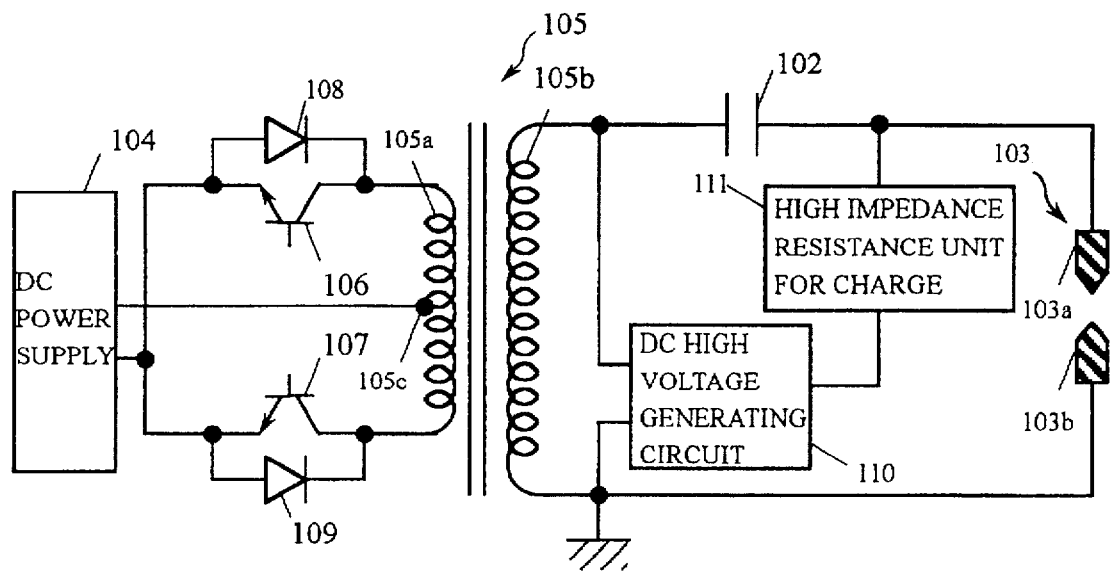
FIG. 16 is a circuit diagram of a prior-art electric discharge apparatus.

As will be appreciated from the foregoing description, the electric discharge apparatus according to the present invention has an advantage over a prior-art apparatus in rendering the circuit small-sized and simple because of the fact that the electric discharge apparatus according to the present invention has no need of comprising devices such as the DC high voltage generating circuit 110 and the high impedance resistance unit 111 shown in FIG. 16. Also, the apparatus according to the present invention has an advantage over the prior-art apparatus in shortening a period during which the voltage across the discharge electrodes is boosted to a high voltage level allowing the electric discharge to start. The apparatus according to the present invention thus advantageous over the prior-art apparatus is suitable for an optical fiber fusion splicing apparatus.

Referring to FIGS. 4 to 7 of the drawings, a second embodiment of the electric discharge apparatus according to the present invention will be described hereinafter. The second embodiment of the electric discharge apparatus includes the same constitutional elements as the first embodiment of the electric discharge apparatus does. The constitutional elements of the second embodiment are respectively designated by the same reference numerals and symbols as the individual constitutional elements of the first embodiment are done, with the intention of omitting repeated description thereof.

Figure 4:
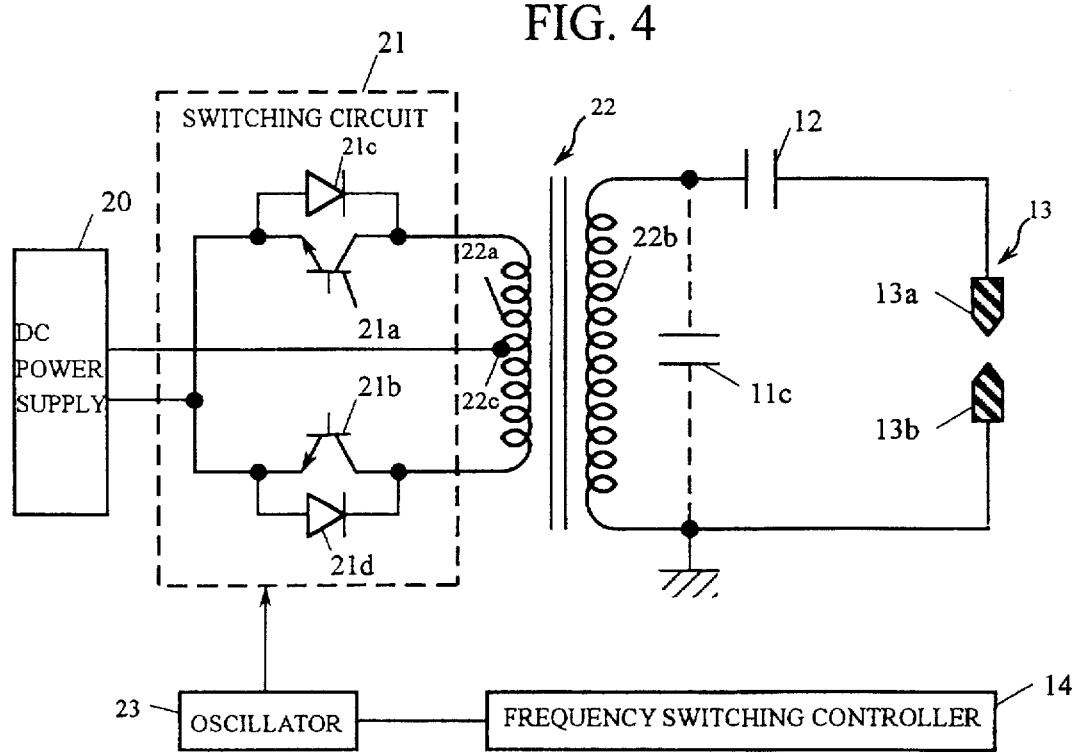
FIG. 4 is a circuit diagram showing a second embodiment of the electric discharge apparatus according to the present invention.

The electric discharge apparatus is shown in FIG. 4 as comprising a DC power supply 20, a switching circuit 21, a boosting transformer 22, an oscillator 23 besides the capacitor 12, and the discharge electrode unit 13 and the discharge electrode unit 13. The electric discharge apparatus shown in FIG. 4 is considered to be equivalent to that shown in FIG. 1. The DC power supply 20, the switching circuit 21, the boosting transformer 22 and the oscillator 23 collectively represents the alternating voltage generator 11 shown in FIG. 1 in the concrete. More specifically, the inductance element 11b and the capacitance element 10c shown in FIG. 1 are embodied in a leakage inductance of the boosting transformer 22 and a stray capacitance of the boosting transformer 22, respectively. Alternatively, a choking coil embodying the inductance element 11b and a capacitor embodying the capacitor element 11c may be installed in the electric discharge apparatus to obtain a desired resonant characteristic. FIG. 4 shows, by phantom lines, only the capacitor corresponding to the capacitance element 11c.

The DC power supply 20 has a pair of output terminals and applying a direct current voltage to the switching circuit 21 and the boosting transformer 22 through the output terminals. The switching circuit 21 is shown in FIG. 4 as comprising switching transistors 21a and 21b respectively having three terminals consisting of base, emitter and collector terminals, and diodes 21c and 21d respectively having an anode and a cathode. The boosting transformer 22 comprises a primary winding 22a, a secondary winding 22b and a center tap 22c. One of the output terminals of the DC power supply 20 is connected to the center tap 22c of the boosting transformer 22, while the other of the output terminals of the DC power supply 20 is connected to the emitter terminals of the switching transistors 21a and 21b. The collector terminal of the switching transistor 21a is connected to one end of the primary winding 22a of the boosting transformer 22, while the collector terminal of the switching transistor 21b is connected to the other end of the primary winding 22a of the boosting transformer 22. The diodes 21c and 21d are inversely connected in parallel to the switching transistors 21a and 21b, respectively.

The secondary winding 22b of the transformer 22 is connected at its one end to the discharge electrode 13a through the capacitor 12, and at its the other end to the discharge electrode 13b. The oscillator 23 is designed to generate a pulse signal having a frequency and formed by driving pulses. The frequency of the pulse signal is regulated by the frequency switching controller 14. The base terminals of the switching transistors 21a and 21b receive the pulse signal from the oscillator 23, so that the switching transistors 21a and 21b are driven in accordance with the received pulse signal. When the switching transistor 21a is driven in accordance with the pulse signal to turn on the electric current through one of two parts of the primary winding 22a divided by the center tap 22c, the switching transistor 21b is driven by the oscillator 23 to turn off the electric current through the other of the two parts of the primary winding 22a, and vice versa. The operations of "ON/OFF" are repeated in accordance with the pulse signal from the oscillator 23 and, as a result, the alternating voltage is applied to the primary winding 22a of the boosting transformer 22. The alternating voltage is boosted by the boosting transformer 22 and applied to the discharge electrodes 13a and 13b through the capacitor 12.

Figure 5:
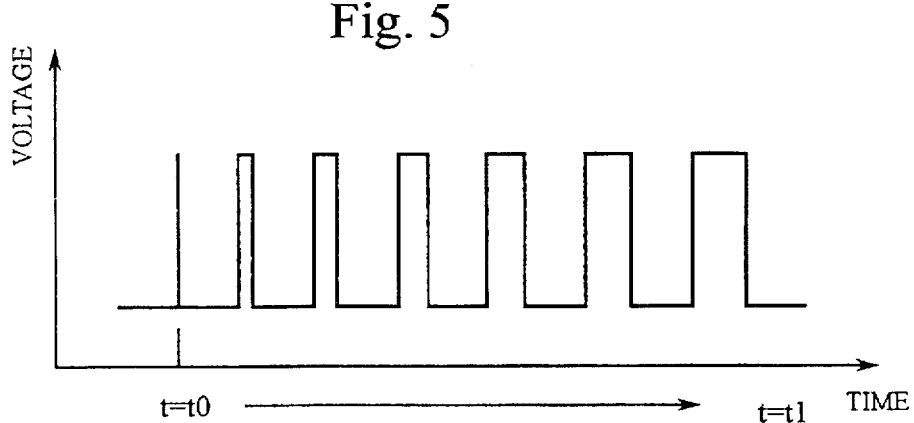
FIG. 5 is a wave form chart showing a pulse variation of a pulse signal generated by an oscillator shown in FIG. 4.
Figure 6:
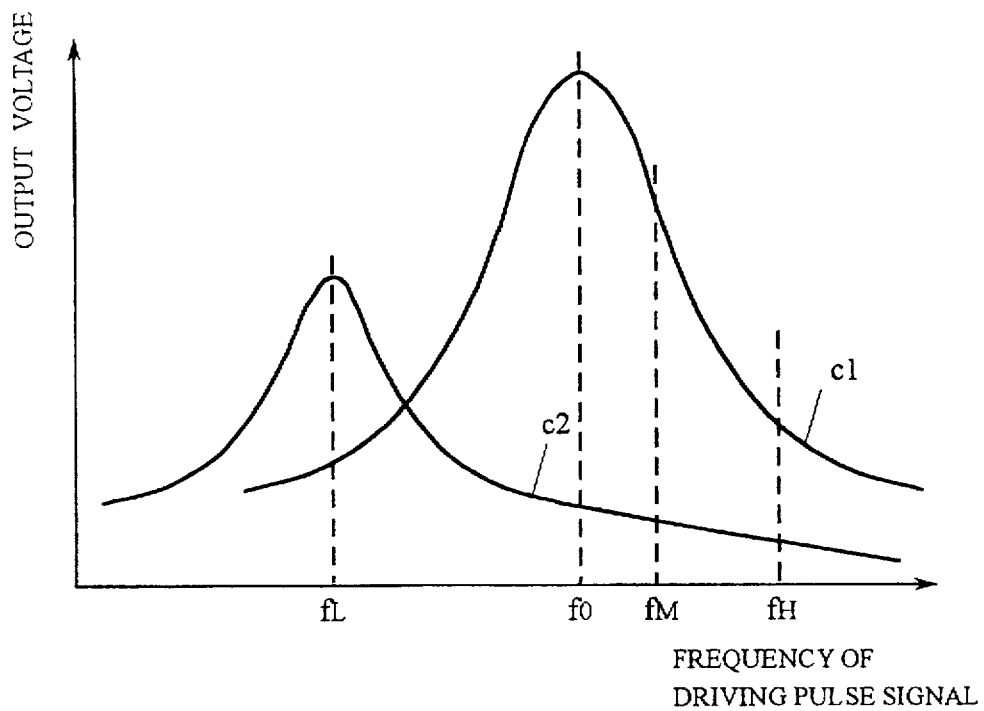
FIG. 6 is a graph showing an relationship between an output voltage of a secondary winding of a boosting transformer 22 shown in FIG. 4 and a frequency of the pulse signal of the oscillator shown in FIG. 4 before and after an electric discharge is started.
Figure 7:
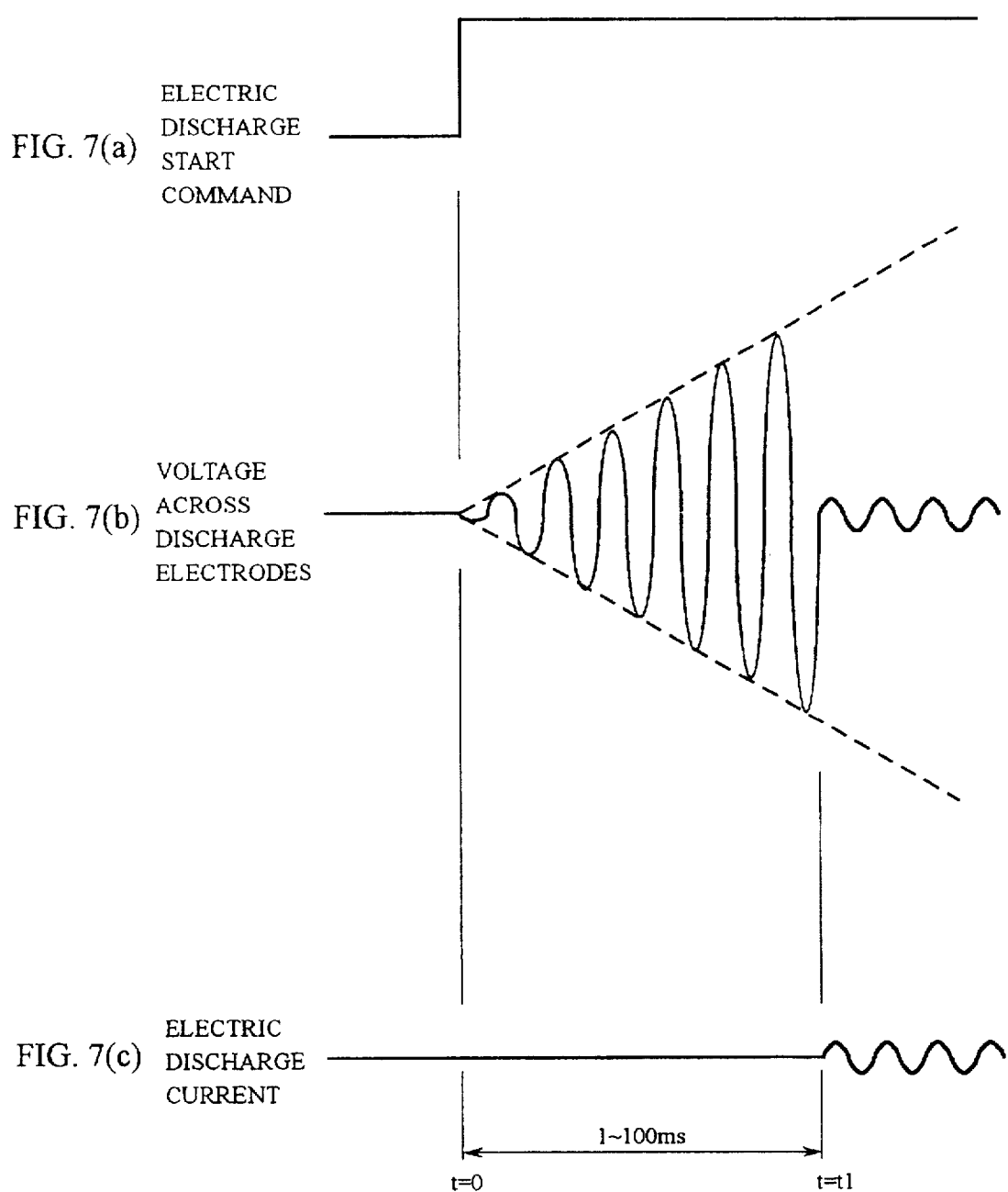
FIG. 7(a) is a wave form chart showing a command signal instructing the electric discharge to start.
FIG. 7(b) is a wave form chart showing a variation of a voltage across discharge electrodes shown in FIG. 4.
FIG. 7(c) is a wave form chart showing a variation of an electric discharge current flowing through a gap between the discharge electrodes shown in FIG. 4.

The frequency control by the frequency switching controller 14 before the start of the electric discharge will be described hereinafter with reference to FIGS. 5 to 7. When the frequency switching controller 14 gives the oscillator 23 a command to start the electric discharge at a time t0, the frequency of the pulse signal outputted from the oscillator 23 is decreased from a frequency fH toward a frequency f0 in accordance with a time constant corresponding to CR. At the same time, the pulse width of the pulse signal outputted from the oscillator 23 is increased from zero toward a predetermined pulse width in accordance with another time constant corresponding to CR.

After t=0, an absolute value of the voltage peak across the discharge electrodes 13a and 13b is gradually increased as shown in FIG. 7(b). The first reason for this is that the frequency of the pulse signal is, at first, considerably higher than fH and gradually increased from the frequency fH to the frequency f0 with the lapse of time. The second reason for this is that the pulse width of the pulse signal is, at first, zero and gradually increased from zero toward the predetermined pulse width with the lapse of time. If the voltage peak across the discharge electrodes reaches a certain voltage peak level in the vicinity of the series resonant frequency f0 shown in FIG. 6, the electric discharge is started. The period from the output of the discharge starting command to the start of the electric discharge may be a period from 1 to 100 ms as shown in FIG. 7(c). After the electric discharge is started, the frequency and/or the pulse width of the pulse signal are regulated to control the electric discharge current flowing through the gap between the discharge electrodes 13a and 13b.

Although the switching circuit 21 is constituted by the switching transistors 21a and 21b and the diodes 21c and 21d in the second embodiment, this is merely by way of example and, thus, the switching circuit 21 may be constituted by an inverter of the half bridge type disclosed in the foregoing Provisional Patent No. 61-22555, an inverter of the half-wave type disclosed in the foregoing Provisional Patent No. 62-40948, or a circuit adopting a reverse conducting thyristor as a switching element.

Although, furthermore, it is assumed that the switching circuit 21 is separately excited in accordance with the pulse signal from the oscillator 23, this is also merely by way of example and, thus, the switching circuit 21 may be a self-excitation type circuit which is operated to self-determine a frequency for the switching. In addition, the switching transistors 21 and 21b are merely by way of example and may be replaced with Field Effect transistors (each generally referred to as "FET" for brevity).

If the switching circuit 21 is modified as described hereinbefore, the boosting transformer 22 may be modified. For instance, the center tap 22c is eliminated from the boosting transformer 22, or the boosting transformer 22 may further comprise an auxiliary winding. Alternatively, the boosting transformed 22 is excluded from the electric discharge apparatus when the switching circuit 21 is capable of outputting a sufficient alternating voltage to cause an electric discharge in the gap between the discharge electrodes 13a and 13b.

The oscillator 23 may be a free running multivibrator in which the frequency of the pulse signal is determined on the basis of the product of a resistance value multiplied by a capacitance value. For example, the free running multivibrator comprises two capacitors having different capacitance values or two resistors having different resistance values. The frequency of the pulse signal of the free running multivibrator is varied by changing one of the resistors to the other of the resistors. Alternatively, the oscillator 23 may be a voltage controlled oscillator (generally referred to as "VCO" for brevity) in which the frequency of the pulse signal is varied by regulating a voltage of a control signal.

Although it has been assumed that the output voltage of the switching circuit 21 is controlled by regulating the frequency of the pulse signal outputted from the oscillator 23, this is merely by way of example and, thus, the output voltage of the switching circuit 21 may be controlling by modulating the pulse width of the pulse signal of the switching circuit 21 through pulse width modulation techniques. In other words, a duty ratio of the pulse signal of the switching circuit 21 may be varied to control the output voltage of the switching circuit 21 and accordingly to control the electric discharge current. If the alternating voltage V2(f1) across the discharge electrodes 13a and 13b is still higher than the desired voltage level after the start of the electric discharge, not only the alternating voltage across the discharge electrodes 13a and 13b but also the electric discharge current is decreased by reducing the duty ratio of the pulse signal.

Figure 8:
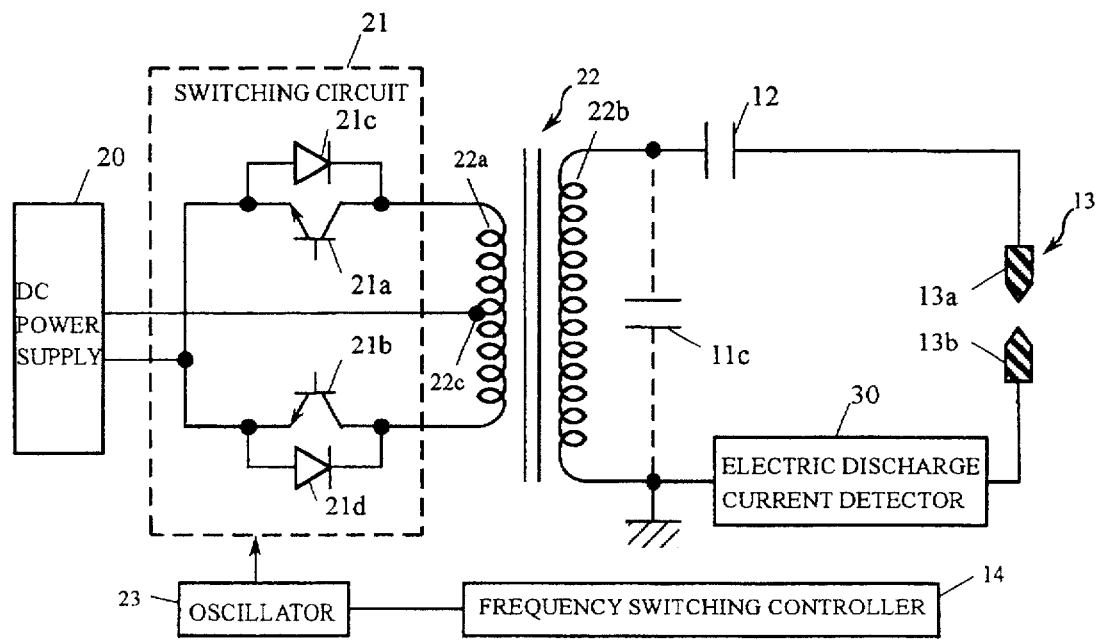
FIG. 8 is a circuit diagram showing a third embodiment of the electric discharge apparatus according to the present invention.

Referring to FIG. 8 of the drawings, a third embodiment of the electric discharge apparatus according to the present invention will be described hereinafter. The third embodiment of the electric discharge apparatus includes the same constitutional elements as the second embodiment of the electric discharge apparatus does. The constitutional elements of the third embodiment are respectively designated by the same reference numerals and symbols as the individual constitutional elements of the second embodiment are done, with intention of omitting repeated description thereof.

The electric discharge apparatus is shown in FIG. 8 as comprising an electric discharge current detector 30 provided in a current carrying line connecting at its one end to the secondary winding 22b of the boosting transformer 22 and the discharge electrode 13b. The electric discharge current detector 30 is designed to detect an electric current flowing through the current carrying line between the secondary winding 22b of the boosting transformer 22 and the discharge electrode 13b and inform the frequency switching controller 14 of the detected electric current. In this embodiment, the frequency switching controller 14 is adapted to compare an absolute value of the detected electric current with a predetermined value. If the frequency switching controller 14 detects that the absolute value of the detected electric current exceeds the predetermined value, the frequency switching controller 14 considers that the electric discharge is started, and, subsequently starts to control the frequency of the pulse signal of the oscillator 23 to obtain a desired electric discharge current. The electric discharge current detector 14 comprises, for example, a resistor having a low resistance value and is operated to rectify and smooth a voltage across the resistor.

The operation and control of the electric discharge apparatus are similar to those of the second embodiment according to the present invention except for the automatically detection of the electric discharge start.

Figure 9:
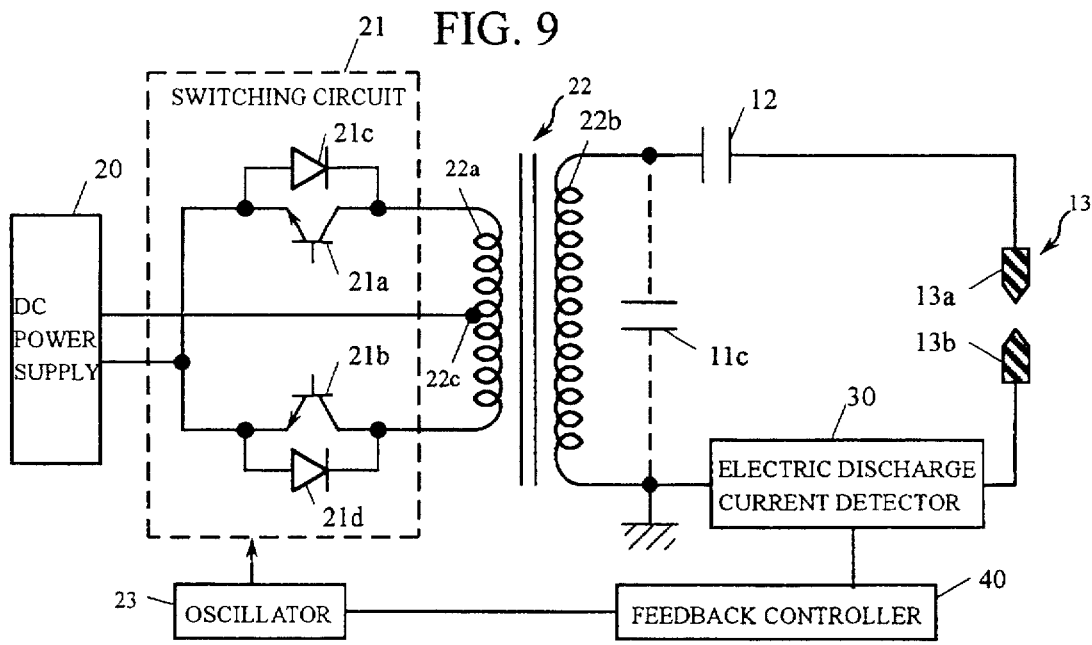
FIG. 9 is a circuit diagram showing a fourth embodiment of the electric discharge apparatus according to the present invention.

Referring to FIG. 9 of the drawings, a fourth embodiment of the electric discharge apparatus according to the present invention will be described hereinafter. The fourth embodiment of the electric discharge apparatus includes the same constitutional elements as the third embodiment of the electric discharge apparatus does. The constitutional elements of the fourth embodiment are respectively designated by the same reference numerals and symbols as the individual constitutional elements of the third embodiment are done, with the intention of omitting repeated description thereof.

The electric discharge apparatus is shown in FIG. 9 as including a feedback controller 40 provided instead of the frequency switching controller 14 shown in FIG. 8. The feedback controller 40 is designed to monitor the electric discharge current based on the output of the electric discharge current detector 30 to self-correct or control the electric discharge current, thereby making it possible to adjust the electric discharge current to a desired level.

Before the electric discharge current detector 30 detects that the electric discharge current flows through the gap between the discharge electrodes 13a and 13b, the frequency of the pulse signal of the oscillator 23 is set to the series resonant frequency f1 or to a frequency in the vicinity of the series resonant frequency f1 by the feedback controller 40. While the electric discharge is continued, the frequency or pulse width of the pulse signal of the oscillator 23 is controlled by the feedback controller 40 to adjust the discharge current to the desired level.

If the discharge current is smaller than a predetermined current level immediately after the start of the electric discharge, the frequency of the pulse signal is decreased toward the series resonant frequency f2 by the feedback controller 40. The decrement of the frequency of the pulse signal means that the output voltage of the switching circuit 21 is increased and, accordingly, the electric discharge current is increased and approaches the predetermined current level. If the electric discharge current exceeds the predetermined current level, the frequency of the pulse signal of the oscillator 23 is controlled by the feedback controller 40 to increase. The increment of the frequency of the pulse signal means that the output voltage of the switching circuit 21 is decreased and, consequently, the electric discharge current is held at the predetermined current level.

If, on the other hand, the electric discharge current exceeds the predetermined current level immediately after the start of the electric discharge, the frequency or the pulse width of the pulse signal is decreased by the feedback controller 40. The decrement of the frequency or pulse width results in the fact that an energy supplied to the secondary winding 22b of the boosting transformer 22 becomes smaller and, for this reason, the electric discharge current is reduced, thereby making it possible to cause the electric discharge current to approach the predetermined current level. If the electric discharge current is smaller than the predetermined current level, the pulse width of the pulse signal is increased by the feedback controller 40. The increment of the pulse width of the pulse signal results in the fact that the energy supplied to the secondary winding 22b of the boosting transformer 22 is increased and, as a consequence, the electric discharge current is held at the predetermined current level. It is noted that the pulse width of the pulse signal immediately after and before the start of the electric discharge is preferably adjusted approximately to the largest value, i.e., the duty ratio of the pulse signal is preferably adjusted approximately to 50%.

As will be understood from the foregoing description, the feedback controller 40 enables the electric discharge apparatus to carry out the feedback control based on the regulation of the frequency and/or pulse width of the pulse signal of the oscillator 23. This means that not only the frequency of the alternating voltage across the discharge electrodes 13a and 13b can be set to a desired frequency level, but also the electric discharge current can be automatically held at the predetermined current level.

If the DC power supply 20 is a battery unit, a drawback is encountered in that the electric discharge apparatus is varied in operation characteristic or cannot adjust the electric discharge current to the desired current level because of the fact that the output voltage of the battery is gradually reduced with the lapse of time. In this instance, the electric discharge apparatus may further comprise a voltage detector for detecting the output voltage of the DC power supply 20. The feedback controller 40 is operated to increase the pulse width of the pulse signal of the oscillator 23 toward the largest level in accordance with the decrement of the output voltage of the DC power supply 20. The way to eliminate the drawback may be applied to other embodiments of the electric discharge apparatuses each include a battery as DC power supply.

Figure 17:
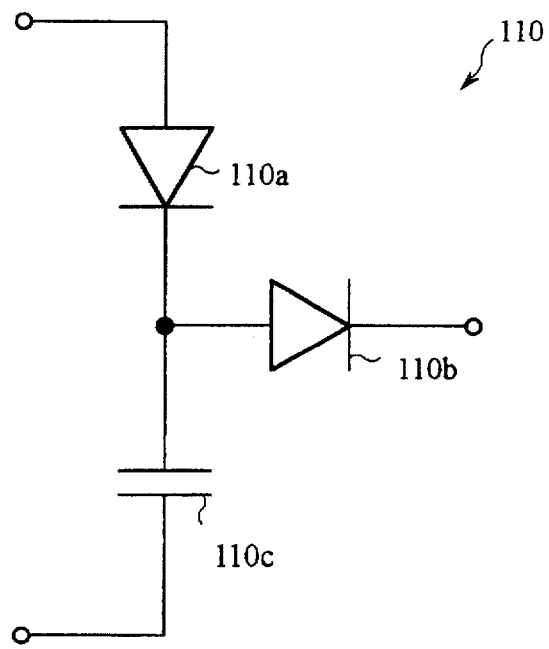
FIG. 17 is a circuit diagram showing a DC high voltage generating circuit shown in FIG. 16.

The discharge current regulation or feedback control techniques in the foregoing embodiment according to the present invention may be applied to the prior-art electric discharge apparatus shown in FIGS. 16 and 17. Since the apparatus shown in FIG. 16 comprises a circuit corresponding to an alternating voltage generator having a series resonant frequency, the circuit is operated with a resonant characteristic similar to that represented by the curve C2 in FIG. 2 after the start of the electric discharge. Therefore, the foregoing electric discharge current regulation or feedback control is performed by controlling the frequency and pulse width of the pulse signal supplied to the base terminals of the switching transistors 106 and 107 shown in FIG. 16. In this case, the frequency of the pulse signal may be set to the series resonant frequency of the circuit shown in FIG. 16 or to a frequency in the vicinity of the series resonant frequency.

Referring to FIGS. 10 to 11 of the drawings, a fifth embodiment of the electric discharge apparatus according to the present invention will be described hereinafter. The fifth embodiment of the electric discharge apparatus includes the same constitutional elements as the first embodiment of the electric discharge apparatus dose. The constitutional elements of the fifth embodiment are respectively designated by the same reference numerals and symbols as the individual constitutional elements of the first embodiment are done, with the intention of omitting repeated description thereof.

The electric discharge apparatus is shown in FIG. 10 as comprising a clamp circuit 50 for clamping the alternating voltage generated by the alternating voltage generator 11 in cooperation with the capacitor 12 while the alternating voltage is applied to the discharge electrodes 13a and 13b through the capacitor 12. In this embodiment, the clamp circuit 50 is a unilateral circuit connected to the capacitor 12 in series and connected to the discharge electrode unit 13 in parallel. More specifically, the clamp circuit 50 is illustrated as comprising a diode 50a and a resistor 50b connected to each other in series. Note that the resistor 50b may be a current-limiting resistor having a relatively large resistance value. In the fifth embodiment, the capacitor 12 may has a capacitance value set within 20–100 pF. The series resonant frequency f1 may be set within 10–300 kHz. The resistor 50b may has a resistance value set within 10 k$\Omega$–100 M$\Omega$. Preferably, the capacitance value of the capacitor 12, the series resonant frequency f1, and the resistance value of the resistor 50b may be set to 60 pF, 60 kHz, and 1 M$\Omega$, respectively.

Since the discharge electrode unit 13 is held in the high impedance state before the start of the electric discharge and since the resistor 50b has the relatively large resistance value, a load bored by the AC power supply 11a is considered to be a series connection circuit of the inductance element 11b and the capacitance element 11c. The frequency of the alternating voltage of the AC power supply 11a is set to the series resonant frequency f1 and to a frequency in the vicinity of the series resonant frequency f1. The alternating voltage is supplied from the AC power supply 11a to the series connection circuit of the inductance element 11b and the capacitance element 11c and, accordingly, a high series resonant voltage is generated at the output terminals of the alternating voltage generator 11.

When the series resonant voltage works upon the diode 50a in a forward direction, the series connection circuit of the diode 50a and resistor 50b allows a few electric current to flow through the capacitor 12 and, as a result, has the capacitor 12 charged. When, conversely, the series resonant voltage works upon the diode 50a in a backward direction, the series connection circuit of the diode 50a and the resistor 50b prevents the electric current from flowing through the capacitor 12. At this time, the series resonant voltage generated at the output terminals of the alternating voltage generator 11 is added to the voltage across the charged capacitor 12 and then applied to the discharge electrodes 13a and 13b. Therefore, the voltage across the discharge electrodes 13a and 13b is varied in the form of sinuous wave with the lapse of time as shown in FIG. 11(a). The lower voltage peaks of the voltage across the discharge electrodes 13a and 13b are clamped approximately at a zero voltage level. The upper voltage peaks of the voltage across the discharge electrodes 13a and 13b are gradually increased. After several repetitions of the cycle of the voltage variation, the electric discharge between the discharge electrodes 13a and 13b is caused to start. As a result, the electric discharge current starts to flow through the gap between the discharge electrodes 13a and 13b as shown in FIG. 11(b).

When the electric discharge is started, the discharge electrode unit 13 serves as a low impedance state load. This results in the fact the capacitance element 11c and the capacitor 12 are considered to be a parallel connection circuit. Since the resistance value of the resistor 50b is relatively large, the resistor 50b has no influence upon the parallel connection circuit of the capacitance element 11c and the capacitor 12. The AC power supply 11a, therefore, bears a load comprising the inductance element 11b and the parallel connection circuit of the capacitance element 11c and the capacitor 12. After the start of the electric discharge, the electric discharge apparatus shown in FIG. 10 has a series resonant frequency characteristic similar to that represented by the curve C2 shown in FIG. 2 and, for this reason, the output voltage of the alternating voltage generator 11 can reach the voltage peak V2(f2) at the series resonant frequency f2 as shown in FIG. 2.

As will be appreciated from the foregoing description, the resonant voltage shown in FIG. 11(a) has upper voltage peaks which are respectively twice as large as those shown in FIG. 3(a). Even if the AC power supply 11a has a small output voltage in comparison with that of the first embodiment, the electric discharge apparatus can start the electric discharge. It is assumed that the alternating voltage generator 11 comprises a DC power supply and a switching circuit. Even if the DC power supply has a small output voltage in comparison with that of the second embodiment, the electric discharge apparatus can start the electric discharge. It is, in addition, assumed that the alternating voltage generator 11 comprises a boosting transformer. Even if the boosting transformer has a small boosting ratio in comparison with that of the second embodiment, the electric discharge apparatus can start the electric discharge. Therefore, the electric discharge apparatus can be simplified in construction.

Although the clamp circuit 50 includes only one diode in this embodiment, the clamp circuit 50 may includes a plurality of diodes connected in series. The series connection of diodes enables the clamp circuit 50 to withstand the high voltage. If, however, desired, the clamp circuit 50 may includes no diode. The clamp circuit 50 may be a unilateral circuit which comprises not the diode but a unilateral element allowing an electric current to flow in a forward direction and preventing the electric current from flowing in a backward direction. Alternatively, the unilateral circuit may comprise a complex circuit including the unilateral element.

Although, furthermore, the clamp circuit 50 shown in FIG. 10 is a positive clamper as appreciated from FIG. 11(a), the clamp circuit 50 may be a negative clamper having the diode 50a reversed and connected to the resistor 50b. Alternatively, the clamp circuit 50 may be a base clamper or a peak clamper including a bias power supply connected to the diode 50a in series. Alternatively, furthermore, the clamp circuit 50 may be any circuit, provided the circuit causes the electric discharge in the gap between the discharge electrodes 13a and 13b by adding DC components to a wave form having no DC component, and further provided the circuit is capable of starting the electric discharge with stability.

Since the resistor 50b of the clamp circuit 50 has the relatively large resistance value, the undesired influence by the resistor 50b upon the electric discharge apparatus is little during the electric discharge. If, however, desired, the clamp circuit 50 may further comprise a switching unit connected to the resistor 50b in parallel. The switching unit assumes two different switching positions consisting of a first switching position in which both ends of the resistor 50b are short-circuited to disable the resistor 50b, and a second switching position in which the short circuit of the both ends of the resistor 50b is canceled to enable the resistor 50b.

Figure 12:
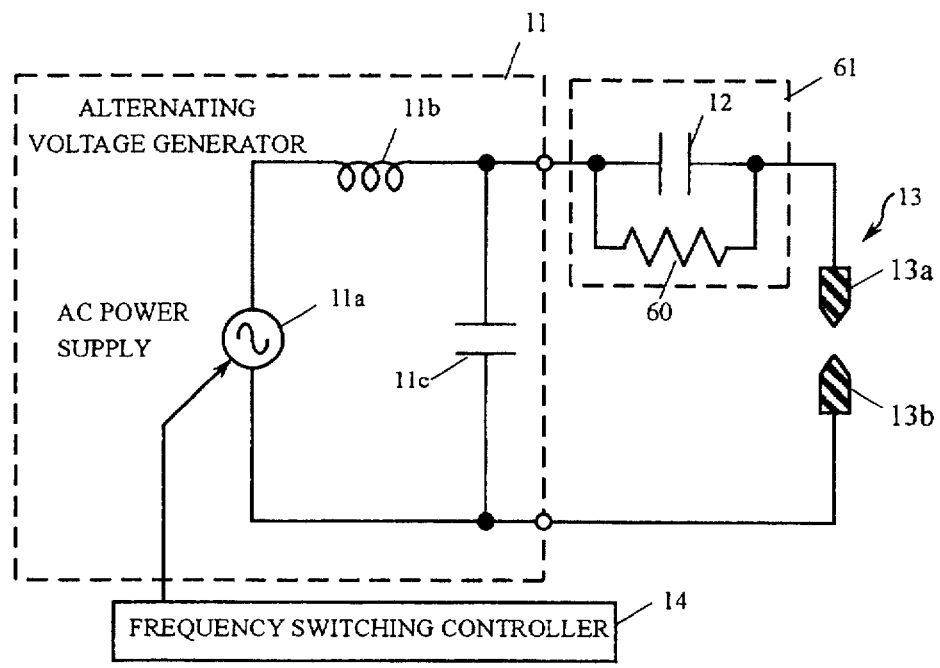
FIG. 12 is a circuit diagram showing a sixth embodiment of the electric discharge apparatus according to the present invention.

Referring to FIG. 12 of the drawings, a sixth embodiment of the electric discharge apparatus according to the present invention will be described hereinafter. The sixth embodiment of the electric discharge apparatus includes the same constitutional elements as the first embodiment of the electric discharge apparatus does. The constitutional elements of the sixth embodiment are respectively designated by the same the reference numerals and symbols as the individual constitutional elements of the first embodiment are done, with the intention of omitting repeated description thereof.

The electric discharge apparatus is shown in FIG. 12 as comprising a resistor 60 connected in parallel to and bypassing the capacitor 12. The resistor 60 has a resistance value incomparably larger than a reactance value of the capacitor 12. The capacitor 12 and the resistor 60 as a whole form a parallel connection circuit 61. Similarly to the five embodiment, the capacitor 12 may has a capacitance value set within 20–100 pF and the series resonant frequency f1 may be set within 10–300 kHz. The resistor 60 may has a resistance value set within 10 kΩ–100 MΩ. Preferably, the capacitance value of the capacitor 12, the series resonant frequency f1, and the resistance value of the resistor 60 may be set to 60 pF, 60 kHz, and 1 MΩ, respectively.

The AC power supply 11a bears a load which is considered to be a series connection circuit of the inductance element 11b and the capacitance element 11c before the start of the electric discharge because of the fact that the discharge electrode unit 13 is held in the high impedance state and that the resistance value of the resistor 60 is extremely large. First, the frequency of the alternating voltage of the AC power supply 11a is set to the series resonant frequency f1 or to a frequency in the vicinity of the series resonant frequency f1. The alternating voltage is supplied from the AC power supply 11a to the series connection circuit of the inductance element 11b and the capacitance element 11c and, accordingly, a high series resonant voltage is generated at the output terminals of the alternating voltage generator 11. The resonant voltage is divided into two voltages, one of the voltages being applied to the parallel connection circuit 61 and the other of the voltages being applied to the discharge electrode unit 13. The voltage across the discharge electrode unit 13 is varied in the form of a sinuous curve and, accordingly, has an absolute voltage peak level gradually increased with the lapse of time as shown FIG. 3(a). After several repetitions of the cycle of the voltage variation, the electric discharge between the discharge electrodes 13a and 13b is started. As a result, the electric discharge current flows through the gap between the discharge electrodes 13a and 13b as shown in FIG. 3(b).

When the electric discharge is started, the discharge electrode unit 13 serves as a low impedance load. At the same time, the capacitance element 11c and the capacitor 12 are considered to be a parallel connection circuit. Since the resistance value of the resistor 60 is extremely large, the resistor 60 has little influence upon the parallel connection circuit of the capacitance element 11c and the capacitor 12. The AC power supply 11a, therefore, bears a load comprising the inductance element 11b and the parallel connection circuit of the capacitance element 11c and the capacitor 12. After the start of the electric discharge, the electric discharge apparatus shown in FIG. 12 has a series resonant characteristic similar to that represented by the curve C2 shown in FIG. 2 and, for this reason, the voltage across the discharge electrodes 13a and 13b can reach a voltage peak at the series resonant frequency f2.

In the sixth embodiment of the electric discharge apparatus according to the present invention, the resistor 60 is connected in parallel to and bypasses the capacitor 12 and accordingly results in the following advantages. Even if the AC power supply 11a has a small output voltage in comparison with that of the first embodiment, the electric discharge apparatus can start the electric discharge. It is assumed that the alternating voltage generator 11 comprises a DC power supply and a switching circuit. Even if the DC power supply has a small output voltage in comparison with that of the second embodiment, the electric discharge apparatus can start the electric discharge. It is, in addition, assumed that the alternating voltage generator 11 comprises a boosting transformer. Even if the boosting transformer has a small boosting ratio in comparison with that of the second embodiment, the electric discharge apparatus can start the electric discharge. Therefore, the electric discharge apparatus can be simplified in construction. Since the resistor 60 has the relatively large resistance value, the resistor 60 has little undesired influence upon the electric discharge apparatus during the electric discharge. If, however, desired, the resistor 60 is disconnected from the capacitor 2 after the electric discharge is started.

Figure 13:
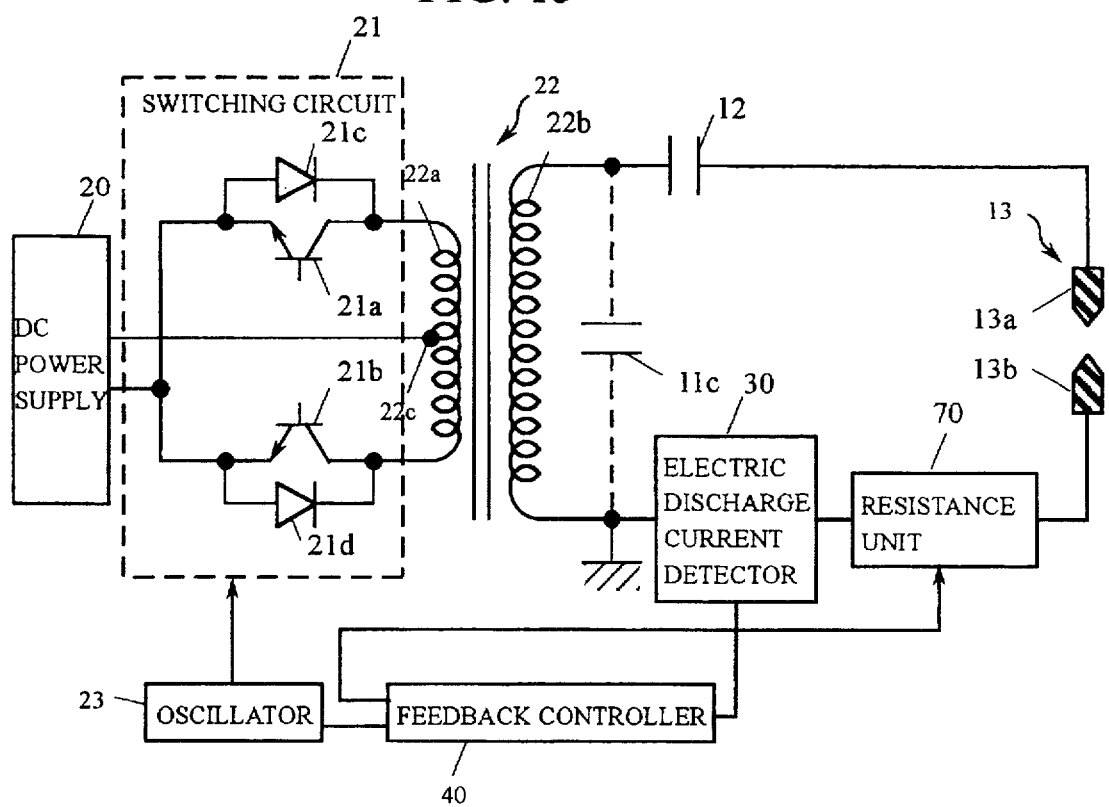
FIG. 13 is a circuit diagram showing a seventh embodiment of the electric discharge apparatus according to the present invention.
Figure 14:
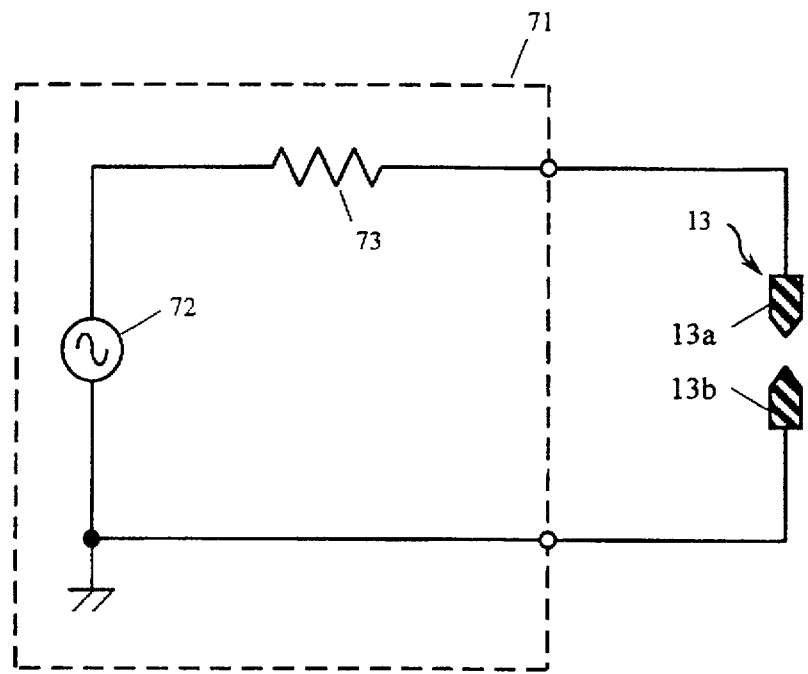
FIG. 14 is a circuit diagram of an electric discharge apparatus used for explaining the basis of the advantage resulting from a resistance unit 70 shown in FIG. 13.
Figure 15:
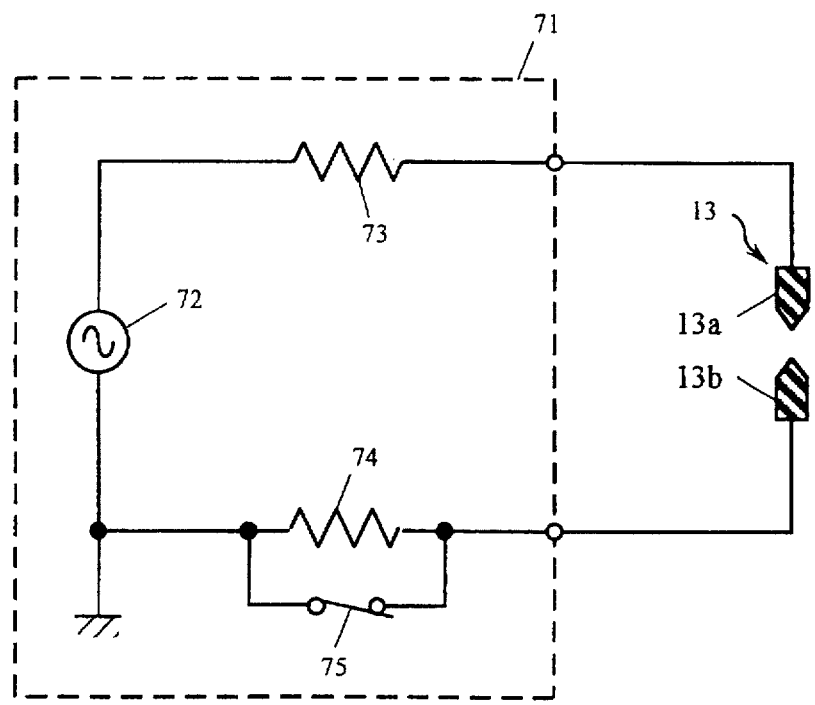
FIG. 15 is a circuit diagram of another electric discharge apparatus used for explaining the basis of the advantage resulting from the resistance unit 70 shown in FIG. 13.

Referring to FIGS. 13 to 15 of the drawings, a seventh embodiment of the electric discharge apparatus according to the present invention will be described hereinafter. The seventh embodiment of the electric discharge apparatus includes the same constitutional elements as the fourth embodiment of the electric discharge apparatus does. The constitutional elements of the seventh embodiment are respectively designated by the same reference numerals and symbols as the individual constitutional elements of the fourth embodiment are done, with the intention of omitting repeated description thereof.

The electric discharge apparatus is shown in FIG. 13 as comprising a resistance unit 70 interposed between the electric discharge current detector 30 and the discharge electrode 13b and connected to the discharge electrode unit 13 in series. The resistance unit 70 has a variable resistance value. The feedback controller 40 is operated to regulate the resistance value of the resistance unit 70 to control the electric discharge current. The resistance unit 70 comprises, for example, a resistor connected the discharge electrode unit 13 in series, and a switch connected to the resistor in parallel. The switch assumes two different switching positions consisting of a first switching position in which both ends of the resistor are short-circuited to disable the resistor, and a second switching position in which the short circuit of the both ends of the resistor is canceled to enable the resistor. The electric discharge apparatus thus constructed is intended to stabilize the electric discharge current to an arbitrary value variable throughout a wide current range.

Firstly, the basis of the advantage resulting from the resistance unit 70 will be described hereinlater with reference to FIGS. 14 and 15. FIG. 14 shows a simple electric discharge circuit comprising an alternating voltage generator 71 in addition to the discharge electrode unit 13. The alternating voltage generator 71 comprises an AC power supply 72 generating an alternating voltage and a current-limiting resistor 73 interposed between the AC power supply 72 and the discharge electrode 13a. The output voltage of the AC power supply 72 is applied to the discharge electrode unit 13 through the current-limiting resistor 73 as well as through internal resistance of the AC power supply 72 and so on. The internal resistance has an impedance varied imperceptibly. From the view of the discharge electrode unit 13, the alternating voltage generator 71 has an internal impedance that is varied within a narrow impedance range. In the electric discharge circuit thus constructed, the output voltage of the alternating voltage generator 71 is varied within a narrow voltage range depending upon the foregoing narrow impedance range and, as a consequence, the electric discharge current is variable only within a narrow current range based on the narrow voltage range. In a conventional electric discharge circuit, the electric discharge current is controlled by regulating the output voltage of the AC power supply. The AC power supply is, therefore, required to reduce its output voltage in order to decrease the electric discharge current. If, however, the output voltage is decreased approximately to a voltage for the maintenance of the electric discharge, the electric discharge is unsteadied and, at the worst, stopped.

Therefore, in order to hold the electric discharge in a stable state, the electric discharge current is required to be regulated under the condition that the output voltage of the AC power supply is sufficiently higher than an electric discharge maintenance voltage, or a voltage for the maintenance of the electric discharge. In the apparatus shown in FIG. 14, the variation of the internal impedance is within the narrow impedance range, so that the electric discharge current cannot be regulated within a wide current range. In addition, the internal impedance is required to be increased in order to decrease the electric discharge current. The increment of the internal impedance, however, results in the fact that the apparatus has a large power loss and, for this reason, works with low efficiency.

FIG. 15 shows an electric discharge apparatus constructed in view of the forgoing drawbacks of the circuit shown in FIG. 14. The electric discharge apparatus shown in FIG. 15 further comprises a resistor 74 interposed between the AC power supply 72 and the discharge electrode 13b, and a switch 75 connected to the resistor 74 in parallel. More specifically, the resistor 74 and the switch 75 are connected to the lower voltage side electrode 13b of the discharge electrode unit 13. The switch 75 is adapted to assume two different switching positions consisting of a first switching position in which both ends of the resistor 74 are short-circuited to disable the resistor 74, and a second switching position in which the short circuit of the both ends of the resistor 74 is canceled to enable the resistor 74. The first switching position means that the switch 74 is in the "ON" condition, while the second switching position means that the switch 74 is in the "OFF" condition. Although the switch 74 may be a manual switch, the switch 74 may be, preferably, a field effect transistor switch which is of a photo-coupler type capable of insulating the circuit from a controller.

When a small electric discharge current is intended to flow through the discharge electrode unit 13 in the circuit shown in FIG. 15, the switch 75 is changed to the "OFF" condition, thereby enabling the resistor 74. As a consequence, the internal impedance of the circuit from the view of the discharge electrode unit 13 is increased, so that the output voltage of the alternating voltage generator 71 becomes sufficiently high with respect to the electric discharge maintenance voltage. This means that, even if a small electric discharge current is intended to flow through the discharge electrode unit 13, the electric discharge current can be stabilized. When, on the other hand, a large electric discharge current is intended to flow through the discharge electrode unit 13, the switch 75 is changed to the "ON" condition, thereby bypassing and disabling the resistor 74. As a result, the internal impedance of the circuit form the view of the discharge electrode unit 13 is reduced, so that the circuit enables the large discharge current to flow through the discharge electrode unit 13, thereby making it possible to cause the circuit to work with efficiency. In the electric discharge apparatus shown in FIG. 15 and thus constructed, the impedance range throughout which the internal impedance from the view of the discharge electrode unit 13 is variable can varied in accordance with the operation of the switch 75. Therefore, the current range throughout which the electric discharge current is controllably variable is increased with efficiency.

The operation of the electric discharge apparatus shown in FIG. 15 will be described hereinafter in detail. When the AC power supply 72 is operated to generate a high voltage, a dielectric breakdown is caused in the gap between the discharge electrodes 13a and 13b and, accordingly, the electric discharge current is allowed to flow through the discharge electrode unit 13. At this time, the switch 75 may be held in the "ON" condition. The electric discharge current flowing through the circuit is represented by "I" and defined by an equation described as follows:

$$I = Vout/(R+r_g)$$

where "Vout" is indicative of the output voltage of the AC power supply 72, "R" is indicative of the resistance value of the current-limiting resistor 71, and "$r_g$" is indicative of an impedance between the discharge electrodes 13a and 13b at a time when the electric discharge held in a constant state. When the electric discharge current is intended to decrease, the output voltage Vout is required to decrease. If the output voltage Vout approaches the electric discharge maintenance voltage, the electric discharge becomes unsteady. When, on the other hand, the resistor 74 is enable by changing the switch 75 to the "OFF" condition with the intention of decreasing the electric discharge current, the electric discharge circuit allows an electric discharge current I' to flow therethrough. The electric discharge current "I'" is defined by an equation described as follows:

$$I' = Vout/(R+r+r_g)$$

where "r" is indicative of the resistance value of the resistor 74. As will be understood from the equations, the latter electric discharge current I' is larger than the former electric discharge current I under the same output voltage Vout. If the electric discharge current decreased to a small level is intended to be restored to a large level, the intention is accomplished by decreasing the output voltage Vout of the AC power supply 72. If the circuit comprises a current detector detecting the electric discharge current to carry out a feedback control under which the electric discharge current is held at a constant level, the output voltage Vout is increased to such an extent that the latter electric discharge current I' is equal to the former electric discharge current I.

According to the circuit shown in FIG. 15, the output voltage of the alternating voltage generator 71 is held at a level which is sufficiently larger than the electric discharge maintenance voltage. Accordingly, the electric discharge can be stabilized even if a small electric discharge current is intended to flow through the circuit. In other words, the circuit causes a small discharge current to flow therethrough with stability by increasing the internal impedance of the circuit from the view of the discharge electrode unit 13, thereby making it possible to enlarge a current range throughout which the electric discharge current to be set for a desired electric discharge is variable.

Although the alternating voltage generator 71 includes only one resistor 74 except the current-limiting resistor 73, the alternating voltage generator 71 may includes a plurality of resistors collectively forming a resistance unit and respectively having resistance values different from one another. In the resistance unit, one of the resistors is selected and connected to the circuit, so that the resistance unit has a resistance value variable depending upon the selection of the resistors. Alternatively, the circuit may include a variable resistor instead of the resistance 74 and the switch 75. When the resistance unit or the variable resistor is adopted, the apparatus is operated to regulate the resistance value of the resistance unit or the variable resistor to perform the feedback control for the electric discharge current.

Returning back to FIG. 13 of the drawings, the control of the resistance unit 70 will be described hereinafter. The resistance unit 70 is constituted for example by the parallel connection circuit of the resistor 74 and the switch 75 shown in FIG. 15, or other variable resistance units each having a variable resistance value. Although a resistance element corresponding to the current-limiting resistor 73 is not shown in FIG. 13, the resistance element may be included in the resistance unit 70. The reason why the resistance unit 70 is provided on a lower potential line between the discharge current detector 30 and the discharge electrode 13b is that the discharge current detector 30 is connected to a grounded line.

Before the start of the electric discharge, the resistance value of the resistance unit 70 is held at a low level by the feedback controller 40. When the electric discharge current is larger than a desired level immediately after the start of the electric discharge, the pulse width or duty ratio of the pulse signal of the oscillator 23 is reduced and, at the same time, the resistance value of the resistance unit 70 is controlled to increase. This means that the internal impedance is increased and, accordingly that electric discharge current is decreased to approach the desired level. When the electric discharge current is smaller than the desired level, the pulse width or the duty ratio of the pulse signal of the oscillator 23 is increased. This results in the fact that output voltage of the secondary winding 22b of the boosting transformer 22 is increased and, for this reason, the electric discharge current is held at the desired level. On the other hand, the feedback controller 40 may be operated to control the frequency of the pulse signal of the oscillator 23. The fact that the control of the resistance value of the resistance unit 70 as well as the feedback control by varying the pulse width and/or the frequency of the pulse signal of the oscillator are carried out, results in enlarging a current range throughout which the electric discharge current value to be set for the desired electric discharge is variable.

If the DC power supply 20 is a battery unit, the apparatus further may comprise detecting means for detecting an output voltage of the DC power supply 20. If the detecting means detects that the output voltage is decreased, the resistance value of the resistance unit 70 is manually or automatically controlled to decrease. The way to vary the internal impedance of the electric discharge circuit can be applied to the apparatus shown in FIG. 16 or other electric discharge apparatuses each employing a DC high voltage source.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. A method of supplying an electrical energy to a pair of discharge electrodes spaced apart from each other to cause an electric discharge in a gap between said discharge electrodes, comprising the steps of:

(a) preparing an alternating voltage generator for generating, as said electrical energy, an alternating voltage having a frequency, and a capacitor connected to said discharge electrodes in series, said alternating voltage generator having a series resonant frequency;

21

(b) applying said alternating voltage of said alternating voltage generator to said discharge electrodes through said capacitor;

(c) setting the frequency of said alternating voltage approximately to the series resonant frequency of said alternating voltage generator to cause a dielectric breakdown in and allow an electric discharge current to flow through the gap between said discharge electrodes; and (d) clamping said alternating voltage applied to said discharge electrodes through said capacitor to add a direct current component to said alternating voltage.

2. A method of supplying an electrical energy to a pair of discharge electrodes spaced apart from each other to cause an electric discharge in a gap between said discharge electrodes, comprising the steps of:

(a) preparing an alternating voltage generator for generating, as said electrical energy, an alternating voltage having a frequency, and a capacitor connected to said discharge electrodes in series, said alternating voltage generator having a series resonant frequency;

(b) applying said alternating voltage of said alternating voltage generator to said discharge electrodes through said capacitor;

(c) approximating the frequency of said alternating voltage approximately to the series resonant frequency of said alternating voltage generator to cause a dielectric breakdown in and allow an electric discharge current to flow through the gap between said discharge electrodes; and (d) clamping said alternating voltage applied to said discharge electrodes through said capacitor to add a direct current component to said alternating voltage.

3. A method as set forth in claim 2, in which the frequency of said alternating voltage is approximated to the series resonant frequency of said alternating voltage generator from a frequency higher than the series resonant frequency.

4. A method as set forth in claim 2, further comprising the step (e) of controlling said electric discharge current after said electric discharge between said discharge electrodes is started, said controlling step (e) comprising the steps of:

(e1) generating a pulse signal having a frequency and formed by driving pulses respectively having pulse widths;

(e2) generating a direct current voltage;

(e3) inverting said direct current voltage to said alternating voltage in accordance with said pulse signal; and (e4) regulating the pulse widths of said driving pulses to control said electric discharge current.

5. A method as set fort in claim 2, in which said preparing step (a) comprises the step of preparing a resistance unit connected to said discharge electrodes in series and having a variable resistance unit in said applying step (b), and said method further comprising the step (e) of regulating the resistance value of said resistance unit to enlarge a current range throughout which the electric discharge current is a variable.

6. A method as set forth in claim 2, in which said preparing step (a) comprises the step of preparing a resistor connector in parallel to and bypassing said capacitor, said resistor having a resistance value substantially larger than a reactance value of said capacitor, and said alternating voltage being applied to said discharge electrodes through said capacitor and said resistor in said applying step (b).

22

7. A method as set forth in claim 2, further comprising the step (e) of controlling said electric discharge by regulating the frequency of said alternating voltage after said electric discharge between said discharge electrodes is started.

8. A method as set forth in claim 7, in which said controlling step (e) comprises the steps of:

(e1) generating a pulse signal having a frequency and formed by driving pulses;

(e2) generating a direct current voltage;

(e3) inverting said direct current voltage to said alternating voltage in accordance with said pulse signal; and (e4) regulating the frequency of said pulse signal to regulate the frequency of said alternating voltage.

9. An apparatus for supplying a electrical energy to a pair of discharge electrodes spaced apart from each other to cause an electric discharge in a gap between said discharge electrodes, comprising:

a capacitor connected to said discharge electrodes in series;

an alternating voltage generator for generating, as said electrical energy, an alternating voltage having a frequency to apply said alternating voltage to said discharge electrodes through said capacitor, said alternating voltage generator having a series resonant frequency;

frequency setting means for setting the frequency of said alternating voltage approximately to said series resonant frequency of said alternating voltage generator to cause a dielectric breakdown in and allow an electric discharge current to flow through the gap between said discharge electrodes; and clamping means for clamping said alternating voltage applied to said discharge electrodes through said capacitor to add a direct current component to said alternating voltage.

10. An apparatus for supplying an electrical energy to a pair of discharge electrodes spaced apart from each other to cause an electric discharge in a gap between said discharge electrodes, comprising:

a capacitor connected to said discharge electrodes in series;

an alternating voltage generator for generating, as said electrical energy, an alternating voltage having a frequency to apply said alternating voltage to said discharge electrodes through said capacitor, said alternating voltage generator having a series resonant frequency;

frequency approximating means for approximating the frequency of said alternating voltage to said series resonant frequency of said alternating voltage generator to cause a dielectric breakdown in and allow an electric discharge current to flow through the gap between said discharge electrodes; and clamping means for clamping said alternating voltage applied to said discharge electrodes through said capacitor to add a direct current component to said alternating voltage.

11. An apparatus as set forth in claim 10, in which the frequency of said alternating voltage is approximated to the series resonant frequency of said alternating voltage generator from a frequency higher than said series resonant frequency.

12. An apparatus as set forth in claim 10, further comprising current controlling means for controlling said electric discharge current after said electric discharge between said discharge electrodes is started.

said current controlling means comprising a pulse signal generator for generating a pulse signal having a frequency and formed by driving pulses respectively having pulse widths, and a pulse width control circuit for regulating the pulse widths of said driving pulses to control said electric discharge current, and said alternating voltage generator comprising a direct current power supply for generating a direct current voltage, and an inverting circuit interposed between said direct current power supply and said discharge electrodes for inverting said direct current voltage to said alternating voltage in accordance with said pulse signal generated by said pulse signal generator.

13. An apparatus as set forth in claim 10, which forms a fusion splicing apparatus for splicing a pair of optical fibers to each other by exerting said electric discharge upon said optical fibers.

14. An apparatus as set forth in claim 10, in which said alternating voltage generator comprises:

an alternating current power supply for generating a primary alternating voltage; and a boosting transformer for boosting the initial alternating voltage to generate a secondary alternating voltage corresponding to said alternating voltage.

15. An apparatus as set forth in claim 10, further comprising current controlling means for controlling said electric discharge current by regulating the frequency of said alternating voltage after said electric discharge between said discharge electrodes is started.

16. An apparatus as set forth in claim 15, in which said current controlling means comprises a pulse signal generator for generating a pulse signal having a frequency and formed by driving pulses, and a frequency control circuit for regulating the frequency of said pulse signal to control said electric discharge current, and said alternating voltage generator comprising a direct current power supply for generating a direct current voltage, and an inverting circuit interposed between said direct current power supply and said discharge electrodes for inverting said direct current voltage to said alternating voltage in accordance with said pulse signal generated by said pulse signal generator.

17. An apparatus as set forth in claim 10, in which said clamping means comprises a unilateral circuit connected to said discharge electrodes in parallel.

18. An apparatus as set forth in claim 17, in which said unilateral circuit comprises a diode and a resistor connected to each other in series.

19. An apparatus as set forth in claim 10, further comprising:

a resistance unit connected to said discharge electrodes in series and having a variable resistance value;

resistance regulating means for regulating the resistance value of said resistance unit to regulate said electric discharge current to enlarge a current range throughout which the electric discharge current is variable.

20. An apparatus as set forth in claim 19, in which said resistance unit comprises:

a resistor connected to said discharge electrodes in series; and a switch connected to said resistor in parallel, said switch assuming two different switching positions consisting of a first switching position in which both ends of said resistor are short-circuited to disable said resistor, and a second switching position in which the short circuit of the both ends of said resistor is canceled to enable said resistor.

21. An apparatus as set forth in claim 10, further comprising a resistor connected in parallel to and bypassing said capacitor, said resistor having a resistance value substantially larger than a reactance value of said capacitor.

22. An apparatus as set forth in claim 21, further comprising disconnecting means for disconnecting said resistor from said capacitor after said electric discharge between said discharge electrodes is started.

* * * * *